(12) United States Patent
Shinohara et al.

(10) Patent No.: US 9,798,063 B2
(45) Date of Patent: Oct. 24, 2017

(54) LIGHT GUIDE PLATE AND SURFACE ILLUMINATION DEVICE

(71) Applicant: OMRON Corporation, Kyoto-shi, Kyoto (JP)

(72) Inventors: Masayuki Shinohara, Kyoto (JP); Norikazu Kitamura, Osaka (JP); Kazuhide Hirota, Saitama (JP)

(73) Assignee: OMRON Corporation, Kyoto (JP)

( * ) Notice: Subject to any disclaimer, the term of this patent is extended or adjusted under 35 U.S.C. 154(b) by 21 days.

(21) Appl. No.: 14/683,681

(22) Filed: Apr. 10, 2015

(65) Prior Publication Data

US 2015/0323724 A1    Nov. 12, 2015

(30) Foreign Application Priority Data

Apr. 10, 2014 (JP) .................................. 2014-081469

(51) Int. Cl.
*F21V 8/00* (2006.01)
*G02F 1/1335* (2006.01)

(52) U.S. Cl.
CPC ........... *G02B 6/0018* (2013.01); *G02B 6/002* (2013.01); *G02B 6/005* (2013.01); *G02B 6/0058* (2013.01); *G02F 1/133524* (2013.01); *G02F 1/133602* (2013.01); *G02F 1/133615* (2013.01); *G02B 6/0028* (2013.01); *G02B 6/0038* (2013.01)

(58) Field of Classification Search
CPC ......... G02F 1/133615; G02F 1/133524; G02F 1/133602; G02F 1/133603; G02B 6/002; G02B 6/005; G02B 6/0058; G02B 6/0018
See application file for complete search history.

(56) References Cited

U.S. PATENT DOCUMENTS

2014/0111743 A1* 4/2014 Takemura ................. F21S 2/00
349/64
2015/0293289 A1* 10/2015 Shinohara .............. G02B 6/002
349/65

OTHER PUBLICATIONS

Takaira, Kazutada; et al.; "A Novel LED-Backlight System with Tilted Cylindrical Surfaces on the Light Guide Plate" SID Symposium Digest of Technical Papers, vol. 44, Issue 1, pp. 820-823, Jun. 2013 (4 pages).

* cited by examiner

*Primary Examiner* — Dung Nguyen
(74) *Attorney, Agent, or Firm* — Osha Liang LLP

(57) ABSTRACT

A light guide plate has a light conducting portion having a light input surface for introducing light into the light guide plate, a main light guiding body that is thinner than a maximum thickness of the light conducting portion, and disposed continuously from the light conducting portion, a slanted surface that is disposed on the light conducting portion on at least one of a surface near a light output surface and a surface opposite the surface near the light output surface, and that is inclined from a section of the light guide plate that is thicker than the main light guiding body toward an end of the main light guiding body, two cylindrical surfaces that cut into the slanted surface, and a groove formed by the two cylindrical surfaces.

17 Claims, 48 Drawing Sheets

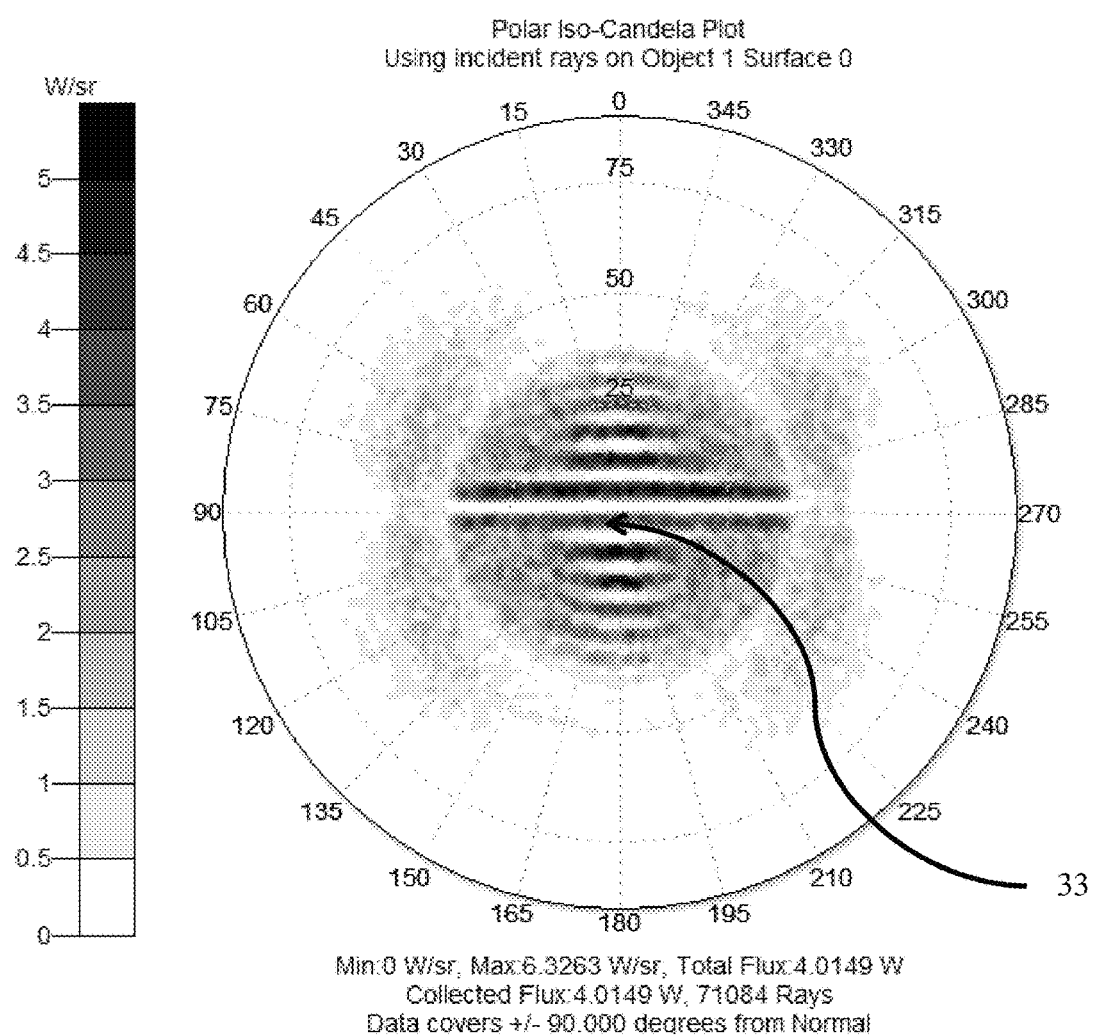

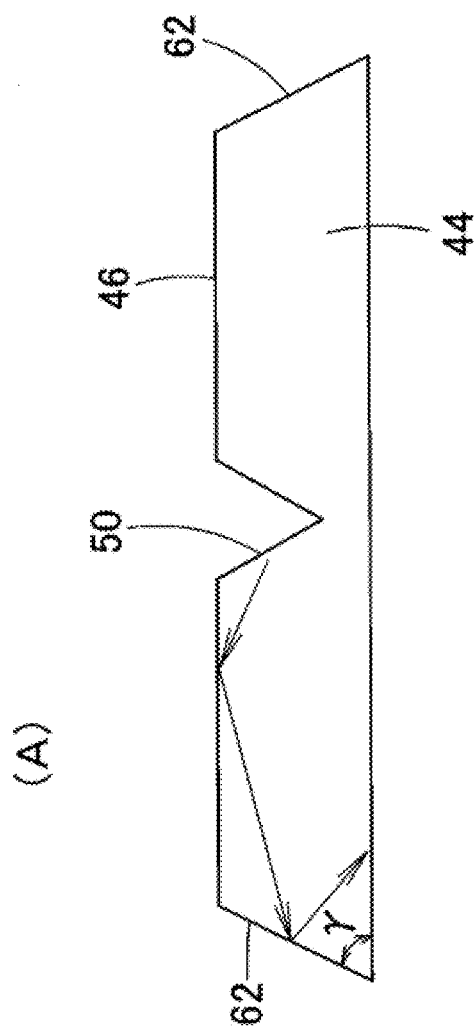

LIGHT GUIDE PLATE AND SURFACE ILLUMINATION DEVICE

BACKGROUND

Field

The present invention relates to a light guide plate and a surface illumination device. More specifically the present invention relates to a surface illumination device used as a backlight in a liquid crystal display device, and a light guide plate used in said surface illumination device.

Related Art

As mobile devices with built-in surface illumination devices become thinner, the surface illumination devices are required to have increasingly thinner profiles. Consequently, the light guide plate must also have a thinner profile to create a thinner surface illumination device. Despite that, even if a planar light guide plate were given a thin profile, there are limitations to reducing the height of the LED in the light source. Therefore, when using a planar light guide plate, the height of the light source will be greater than the thickness of an end surface (light input surface) of the light guide plate. Thus, the light source, which is arranged opposite the light input surface of the light guide plate protrudes from above the upper surface of the light guide plate. In this manner when the light source protrudes from above than the light guide plate, a portion of the light emitted from the light source leaks externally without all the light entering the light input surface of the light guide plate, reducing the light use efficiency in the light guide plate.

The surface illumination device 11 illustrated in FIG. 1 is traditionally used to address this disadvantage. A light source 12 is arranged facing a light input surface 17 of a light guide plate 13 (described next) in a surface illumination device 11. The light guide plate 13 is provided with a light conducting portion 14 that is thicker than the main light guiding body 15 and arranged on an end of the planar main light guiding body 15. The light conducting portion 14 is provided with a slanted surface 16 that is inclined from the thickest section of the light conducting portion 14 toward an end of the main light guiding body 15.

The light input surface 17 provided on the end surface of the light conducting portion 14 higher than the light emission plane (light output window) of the light source 12 in the surface illumination device 11 illustrated in FIG. 1. Therefore, the light emitted from the light source 12 can be efficiently taken into the light conducting portion 14. Additionally, the light incident on the slanted surface 16 while traveling from the thicker light conducting portion 14 toward the thinner main light guiding body 15 is reflected at the slanted surface 16 and guided to the main light guiding body 15. The light guided to the main light guiding body 15 is reflected by an optical pattern (not shown) provided on the lower surface of the main light guiding body 15 and is output externally from a light output surface 18 provided on the upper surface of the main light guiding body 15. Thus, in such a surface illumination device 11, the light from the light source 12 can be efficiently taken in from the light input surface 17, while reducing the amount of light leaked from the light guide plate 13 as the light from the light source is transmitted from the light conducting portion 14 to the main light guiding body 15. Therefore, the light use efficiency of the surface illumination device 11 improves. Furthermore, Light tends not to leak from the slanted surface 16 and the edges of the upper surface of the main light guiding body 15. Therefore, the leaked light tends not to produce glare at the edges of the light output surface 18, and the quality of the surface illumination device 11 improves.

However, as the demand increases for higher-quality surface illumination devices, even the improvements to the light use efficiency in the surface illumination device 11 illustrated in FIG. 1 become less adequate. In particular, the light output from the light source 12 towards the front direction has a small angle of incidence relative to the slanted surface 16; therefore, the light emitted towards the front direction passes through the slanted surface 16 and tends to leak externally from the light guide plate 13. Consequently, it is not possible to obtain sufficient light use efficiency.

"A Novel LED-Backlight System with Tilted Cylindrical Surfaces on the Light Guide Plate" by Kazutada Takaira, Yasuhiro Morii, Seiji Sakai, Kenji Itoga, Akimasa Yuuki; SID Symposium Digest of Technical Papers, Volume 44, Issue 1, pages 820-823, June 2013 (http://onlinelibrary.wiley.com/doi/10.1002/j.2168-0159) (hereinafter, "cited reference") proposes a different surface illumination device structure that improves the light use efficiency in a device having the structure illustrated in FIG. 1. FIG. 2A is a perspective view illustrating the structure of a surface illumination device 21 disclosed in the cited reference. The surface illumination device 21 is provided with two cylindrical surfaces 22 in the slanted surface 16 of the light conducting portion 14. The two cylindrical surfaces 22 create a V-shaped groove 23 therebetween. The two cylindrical surfaces 22 pass through the base line of the groove 23 and are symmetrical about a plane perpendicular to the light input surface 17 and the light output surface 18. Each axis center of the cylindrical surfaces 22 also inclines closer to the light input surface while moving up the axis center. The inclination of the cylindrical surfaces 22 is equal to the inclination of the slanted surface 16. Accordingly, the axis center of the cylindrical surfaces 22 is parallel to the slanted surface 16. The principle axis (the axis coinciding with a principle light beam) through the light emission center of the light source 12 passes through a line intersecting both cylindrical surfaces 22 (the base line of the groove 23) when viewed from a direction orthogonal to the upper surface of the main light guiding body 15, and is located on a straight line orthogonal to the light input surface 17.

FIG. 2B is a schematic plan view illustrating near the light source of the surface illumination device 21 depicted in FIG. 2A. In the surface illumination device 21, the slanted surface 16 is provided before providing the cylindrical surfaces 22. Further, the light rays output from the light source 12 in a front direction are incident on the cylindrical surfaces 22 at an incident angle larger than the incident angle on the slanted surface 16 as depicted by the arrows in FIG. 2B. Therefore, the light traveling in a front direction tends reflect at the cylindrical surfaces 22. As a result, less light leaks from a surface of the light conducting portion 14 along the front direction of the light source 12, and the light use efficiency improves.

FIG. 3 is a graph comparing the light use efficiency of each of the surface illumination devices 11 and 21 in FIG. 1 (Sample 1) and in FIG. 2A (Sample 2) respectively. In FIG. 3, the horizontal axis represents a gradation ratio t/T, and the vertical axis represents a light use efficiency R. The gradation ratio represents the proportion t/T of the height t of the main light guiding body 15 to the height T of the light conducting portion 14. The light use efficiency R is a percentage (%) of the amount of light incident on the light guide plate 13 that is emitted from the light output surface 18 of the light guide plate 13. More specifically, as illustrated in FIG. 4, an optical detector 24 was arranged facing the end surface of the light guide plate 13 that is opposite the light input surface 17. The light use efficiency R in FIG. 3 was calculated using (Is/Io)×100 (%), with To representing the light intensity of the light exiting the light source 12 and incident on the light input surface 17, and Is representing the light intensity measured by the optical detector 24 (i.e., the light intensity of the light exiting the end surface opposite the light input surface 17). However, the measurements taken and depicted in FIG. 3 were of light guide plates having no optical patterns to cause the light to exit from the light output surface 18. That is, the light guide plates were flat, with smooth upper and lower surfaces in the main light guiding body. Therefore the amount of light measured by the optical detector 24 was the amount of light that would have been output upward from the effective area of the light output surface 18 after the light was reflected by an optical pattern.

As illustrated in FIG. 3, the light use efficiency R of the surface illumination device 21 in FIG. 2A (Sample 2) improves significantly compared to the surface illumination device 11 in FIG. 1 (Sample 1). Incidentally, as can be ascertained from the state of the light rays illustrated in FIG. 2B, light leakage toward the front of the light source 12 can be prevented in the case of the surface illumination device 21 which includes the cylindrical surfaces 22. However, the light output from the light source 12 toward the front direction spreads transversely due to being reflected at the cylindrical surfaces 22. As a result, the emission luminance of the light output surface 18 along the front direction of the light source 12 deteriorates, introducing an uneven luminance.

To ensure that the emission luminance of the (effective area of the) light output surface 18 is uniform, conceivably, a lenticular lens 32 may be provided on the upper surface of the main light guiding body 15 in a surface illumination device 31 as illustrated in FIG. 5. A lenticular lens 32 provided on the light output surface 18 alters the directivity of the light output from the light output surface causing the light to spread in the transverse direction, and an even emission luminance in the light output surface 18.

Despite that, when the lenticular lens 32 is provided on the light output surface 18, light tends to leak from the lenticular lens 32, thus creating a diagonal bright line on the upper surface of the main light guiding body 15.

The above situation is described using FIGS. 6A, 6B, and 6C. FIG. 6A shows the state of the surface illumination device 21 with no lenticular lens, and FIG. 6B shows the state of the surface illumination device 31 in FIG. 5 having the lenticular lens 32. In each case, the directivity of light at the end surface opposite the light input surface 17 of the main light guiding body 15 was observed from a direction orthogonal to the light input surface 17. In FIGS. 6A and 6B, a portion is darker in accordance with the light intensity. FIG. 6C illustrates the results of arranging an optical detector 25 opposite the light output surface 18 of the main light guiding body 15 as illustrated in FIG. 4, and using the optical detector 25 to measure the amount of light leaked from the light output surface 18 of the surface illumination device 31. In FIG. 6C, a portion is lighter in accordance with the amount of light leaked.

FIG. 6A shows light beams of obliquely-directed light 34 spreading transversely around the light beams of a front-directed light 33 oriented substantially orthogonal to the light input surface 17 (i.e., frontward). The obliquely-directed light 34 spread transversely due to the cylindrical surfaces 22. Whereas, in FIG. 6B only the front-directed light 33 remains noticeable, while the obliquely-directed light 34 disappears. That is, the obliquely-directed light 34 appears as shown in FIG. 6A, and the same obliquely-directed light 34 disappears from FIG. 6B because this light leaks from the lenticular lens 32. In this manner, the light leaked from the light output surface 18 due to the lenticular lens 32 on the surface illumination device 31 in FIG. 5 becomes the diagonal bright lines illustrated in FIG. 6C (the direction represented by the thin arrows). The light guide plate 13 used here had no optical pattern thereon; therefore, although in this case light should not have leaked from the upper surface of the main light guiding body 15 by design, the light leaking from the lenticular lens 32 created the diagonal bright lines.

The surface illumination device 31 is essentially the surface illumination device 21 illustrated in FIG. 2A with a lenticular lens 32 added thereto. Although light spreads transversely from the cylindrical surfaces 22 in the surface illumination device 31, the light leaks from the lenticular lens 32 and reduces the light use efficiency in the surface illumination device 31. Sample 3, represented by dotted lines in FIG. 3, shows the results of measuring the light use efficiency of the surface illumination device 31 in FIG. 5. As can be understood from comparing Sample 2 and Sample 3, the light use efficiency decreases significantly when a lenticular lens 32 is added to the surface illumination device 21 in FIG. 2A.

Given a surface illumination device with a pair of cylindrical surfaces in the slanted surface of the light guide plate, a lenticular lens may be added to the upper surface of the main light guiding body to address light uniformity problems. However, based on the above technical background, there is a need to prevent the reduction in light use efficiency and the generation of bright lines that occur when adding the lenticular lens.

SUMMARY

A light guide plate according to one or more embodiments of the invention includes a light conducting portion provided with a light input surface for introducing a light; a main light guiding body that is thinner than a maximum thickness of the light conducting portion, and provided continuing from the light conducting portion; a slanted surface that is provided on the light conducting portion on at least one of a surface near a light output surface and a surface opposite the surface near the light output surface and is inclined from a section of the light guide plate that is thicker than the main light guiding body toward an end of the main light guiding body; two cylindrical surfaces provided cutting into the slanted surface; and a groove configured by the two cylindrical surfaces An inclination of the slanted surface with a surface of the main light guiding body near the cylindrical surfaces is smaller than an inclination of an axis center of the cylindrical surfaces with the surface of the main light guiding body.

In the light guide plate according to one or more embodiments of the invention, the axis center of the cylindrical surfaces may increasingly incline closer to the light input surface of the light conducting portion in accordance with moving upward along the axis center.

Additionally, an edge of the slanted surface may touch an edge of the light input surface provided on the light conducting portion.

In one or more embodiments of the present invention, an end of the groove may reach an edge of the light input surface.

When a maximum thickness of the light conducting portion is T, a thickness of the main light guiding body is t, and a length of the slanted surface in a direction parallel to the surface of the main light guiding body is L, the inclination α of the slanted surface in the light guide plate according to one or more embodiments of the invention may be characterized by an expression:

$$\alpha \le \arctan[(T-t)/L]$$

According to one or more embodiments of the present invention, a lenticular lens form may be provided on the light output surface of the main light guide plate.

In the light guide plate according to one or more embodiments of the invention, a first point on a side surface of the light conducting portion is relatively far away from the light input surface, and a second point on the side surface of the light conducting portion is close to the light input surface; and on comparing the first point and the second point on the side surface, an angle the side surface forms with a direction orthogonal to the light input surface at the first point is greater than or equal to an angle the side surface forms with a direction orthogonal to the light input surface at the second point.

In particular, in one or more embodiments of the present invention, when viewed from above, both side surfaces of the light conducting portion are inclined relative to a direction orthogonal to the light conducting portion to increase the width of the light conducting portion in accordance with a distance from the light conducting portion.

Additionally, the side surfaces of the light conducting portion are each configured by a plurality of flat surfaces.

Further, each of the side surfaces of the light conducting portion may be configured by a first flat surface located relatively close to the light input surface and a second flat surface located relatively far away from the light input surface; and on comparing the first flat surface and the second flat surface, a length of the first flat surface along a direction orthogonal to the light input surface is longer than a length of the second flat surface along the direction orthogonal to the light input surface.

Alternatively, the side surfaces of the light conducting portion may each be configured by curved surfaces.

Furthermore, a tip end of a normal line projected outward from the side surface of the light conducting portion is inclined toward a light output portion of the main light guiding body.

In the light guide plate according to one or more embodiments of the invention, a directivity conversion pattern may be provided in a region between the slanted surface and the lenticular lens form.

Moreover, the directivity conversion pattern may be configured from inclined surfaces with different inclination directions arranged next to each other along a width direction of the light input surface. In a cross section of the directivity conversion pattern parallel to the light input surface, a cross-sectional shape of the directivity conversion pattern passes through an emission center of a light incident on the light input surface; and for a region on each side surrounding an imaginary straight line orthogonal to the light input surface, when a normal line is projected from the inside toward the outside of the light guide plate from each of the inclined surfaces in the directivity conversion pattern, a total transverse width for the inclined surfaces where the normal line inclines toward the imaginary line is smaller than a total transverse width for the inclined surfaces where the normal line inclines toward a direction opposite the imaginary line.

A surface illumination device according to one or more embodiments of the invention includes a light guide plate according to any one of the embodiments, and a light source arranged opposite the light input surface of the light guide plate. This surface illumination device may be used in a liquid crystal display device or a mobile device.

Above-described constituent elements may be combined as appropriate, and numerous variations of embodiments of the present invention are possible by combining these constituent elements.

A light guide plate and surface illumination device according to one or more embodiments of the invention is provided with a groove formed by two cylindrical surfaces cut into a slanted surface. The slanted surface is configured such that an inclination between the slanted surface and a surface of a main light guiding body near the cylindrical surfaces is smaller than an inclination between an axis center of the cylindrical surfaces and the surface of the main light guiding body. Therefore, light reflected by the slanted surface, and in particular the light reflected by the cylindrical surfaces and the slanted surface have a larger angle of incidence when incident on the lower surface and the upper surface of the main light guiding body. Consequently, the light tends not to leak from the main light guiding body. As a result, the light use efficiency of a surface illumination device provided with a groove created between cylindrical surfaces improves, while preventing the generation of bright lines.

BRIEF DESCRIPTION OF THE DRAWINGS

FIG. 6A shows the directivity of light within the main light guiding body of the surface illumination device in FIG. 2A.

FIG. 16A is a cross-sectional view along the line X-X in FIG. 15B.

DETAILED DESCRIPTION

Embodiments of the present invention are described below with reference to the attached drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. The invention is not limited to the embodiments described below and may be modified in various ways insofar as the modifications are within the spirit and the scope of the invention.

First Embodiment

Figure 7:
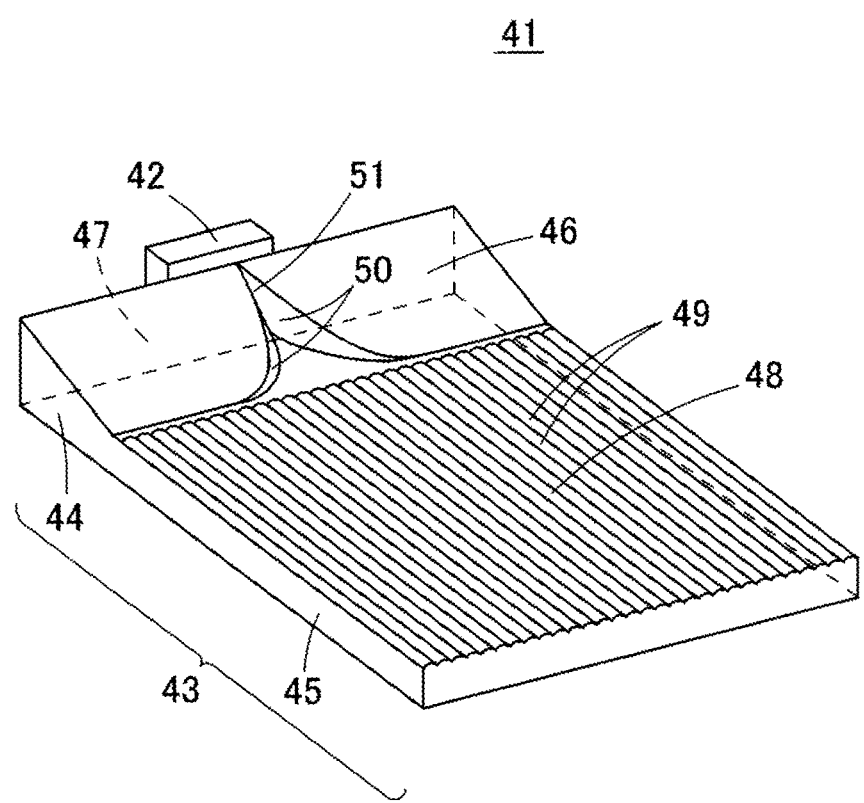
FIG. 7 is a perspective view of a surface illumination device according to a first embodiment.
Figure 8A:
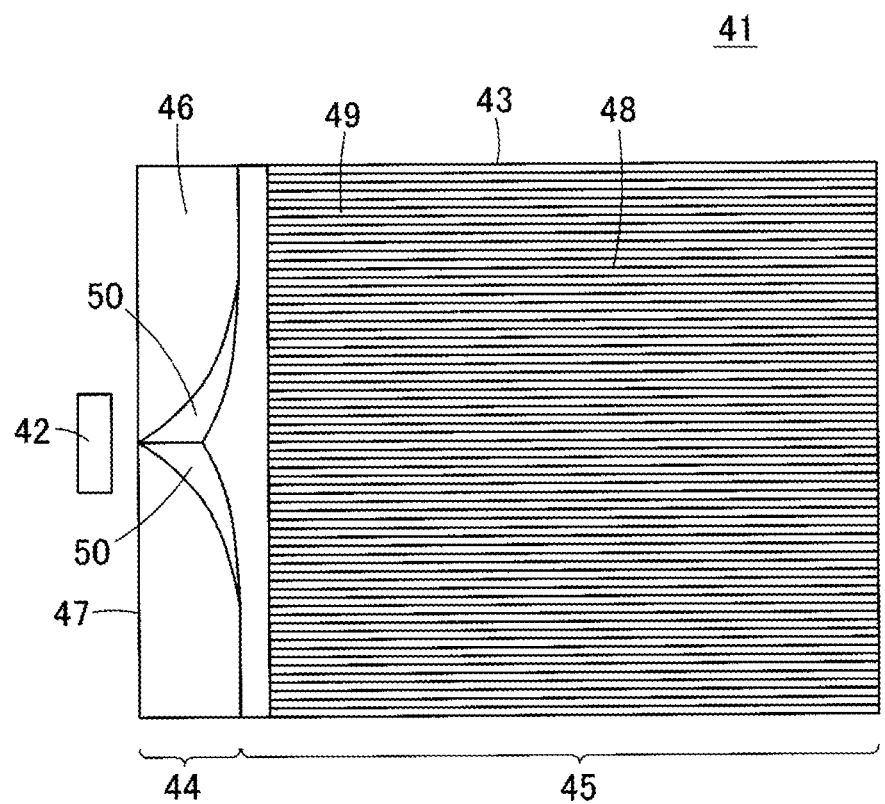
FIG. 8A is a plan view of the surface illumination device illustrated in FIG. 7.
Figure 8B:
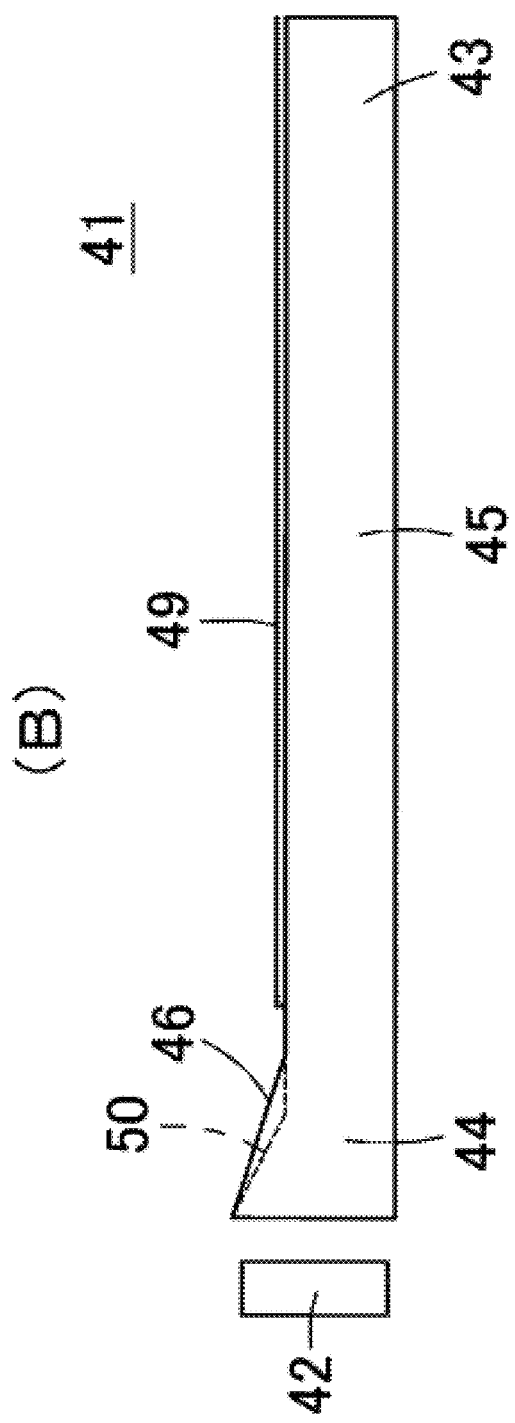
FIG. 8B is a side view of the surface illumination device illustrated in FIG. 7.

A surface illumination device 41 according to a first embodiment is described below with reference to FIGS. 7, 8A, and 8B. FIG. 7 is a perspective view of a surface illumination device 41 according to the first embodiment. FIG. 8A is a plan view of the surface illumination device 41; and FIG. 8B is a side view of the surface illumination device 41.

The surface illumination device 41 contains a light source 42, and a light guide plate 43. The light source 42 may have one or a plurality of LEDs installed that emit white light. Thereby, the light source 42 outputs light from a light output window in the front surface thereof.

The light guide plate 43 includes a thin, planar main light guiding body 45, and a light conducting portion 44. The light conducting portion 44 is provided continuing from an end of the main light guiding body 45. The light guide plate 43 may be integrally formed from a transparent resin having a high refractive index such as an acrylic resin, a polycarbonate resin (PC), an alkene material, a poly(methyl methacrylate) (PMMA), and the like.

The light conducting portion 44 is a thick wedge-shaped portion of the light guide plate 43. An end surface of the light conducting portion 44 is a light input surface 47 arranged opposite the light source 42. The thickness (maximum thickness) T of the end surface of the light conducting portion 44 may be greater than or equal to the height of the light output window of the light source 42. Thus, the light output from the light source 42 may efficiently enter the light conducting portion 44 from the light input surface 47.

A smooth slanted surface 46 is formed on the upper surface of the light conducting portion 44 (i.e., the surface on the same side as the light output surface 48 of the main light guiding body 45). The slanted surface 46 inclines downward from the thickest portion of the light guide plate that is in contact with the light input surface 47 toward an end of the main light guiding body 45. The slanted surface 46 is a strip extending from a first side surface to a second side surface of the light guide plate 43. The inclination of the slanted surface 46 is constant from the top end to the bottom end, and the top end thereof reaches the top end of the light input surface 47. Accordingly, there is no horizontal surface at the top end of the light conducting portion 44.

Two cylindrical surfaces 50 are formed intersecting at the center of the slanted surface 46 in the width direction. The two cylindrical surfaces 50 cut inwards toward the light input surface and create a V-shaped groove 51. Both of the cylindrical surfaces 50 pass through the base line of the groove 51 and are mutually symmetrical about a plane perpendicular to the light input surface 47 and the light output surface 48. The axis center of each of the cylindrical surfaces 50 lies within a plane parallel to the aforementioned perpendicular plane, with the upper part thereof inclined toward the light input surface. The inclination (the angle formed with the horizontal plane) of the axis centers of the cylindrical surfaces 50 is smaller than the inclination of the slanted surface 46. The axis center of the cylindrical surfaces 50 may be slightly skewed relative to the aforementioned perpendicular plane. The upper end of the base line of the groove 51 reaches up to the light input surface 47. Thus, the base line of the groove 51 inclines diagonally upward from the same height as the light output surface 48 to the upper end of the light input surface 47 in accordance with moving from near the main light guiding body toward the light input surface.

The light source 42 lies opposite the light input surface 47 at the center between the cylindrical surfaces 50. That is, the light source 42 is arranged so that when the upper surface of the light guide plate 43 is viewed orthogonally, the principal axis of the light source 42 passes through the base line of the groove 51.

The main light guiding body 45 takes up a majority of the surface area of the light guide plate 43. The thickness t of the main light guiding body 45 is thinner than the maximum thickness T of the light conducting portion 44. Therefore, the light guide plate 43 may have a thin profile. The main light guiding body 45 is a planar shape with parallel front and rear surfaces, and the thickness thereof is substantially uniform.

Optical patterns (not shown) are provided on the lower surface of the main light guiding body 45. The optical patterns reflect light guided into the main light guiding body 45 and cause the light to be output externally from the light output surface 48, which is on the upper surface of the main light guiding body 45. The light output surface includes a plurality of fine lenticular lens 49 provided extending along a direction orthogonal to the light input surface 47. However, the lenticular lens 49 are slightly retreated from the end of the main light guiding body 45 near the light conducting portion, thereby becoming a flat end surface on the upper surface of the main light guiding body 45 near the light conducting portion.

Thus, in the surface illumination device 41, the light output from the light source 42 can be efficiently taken into the light conducting portion 44 from the light input surface 47, which has a greater thickness than the height of the light source 42. The light entering the light conducting portion 44 and incident on the slanted surface 46 is reflected at the slanted surface 46 and guided into the main light guiding body 45. Additionally the light incident on the cylindrical surfaces 50 reflects at the cylindrical surfaces 50, spread transversely and is guided to the main light guiding body 45. When the light is guided into the main light guiding body 45, the light reflects at the optical pattern that is on the lower surface, and is output externally from the light output surface 48 that is on the upper surface. The light output from the light output surface 48 spreads in the width direction of the light guide plate 43 due to the light output surface 48; therefore, the luminance distribution at the light output surface 48 is uniform.

The upper end of the slanted surface 46 extends up to the upper end of the light input surface 47; however, no horizontal surface is provided at the upper end of the light conducting portion 44 in the surface illumination device 41. Therefore, the light conducting portion 44 has a relatively short length L compared to the inclination of the slanted surface 46. In other words, the light conducting portion 44 can be provided without a increasing the amount of dead space in the light guide plate 43. The lower end of the slanted surface 46 also touches the lower end of the cylindrical surfaces 50, thereby reducing the inclination of the slanted surface 46. When the inclination of the slanted surface 46 is reduced in this manner, the angle of incidence increases at the lower surface of the light guide plate 43 for the light reflected at the slanted surface 46, and thus the light tends not to leak from the light output surface 48. The light reflected at the cylindrical surfaces 50 and thereafter also reflected at the slanted surface 46 in particular tends not to leak from the lenticular lens 49, improving the light use efficiency of the surface illumination device 41, and preventing bright lines from being generated. Consequently, the surface illumination device 41 of the first embodiment improves light use efficiency, improves the luminance at the light emission plane, provides a uniform luminance distribution at the light output surface 48, and renders diagonal bright lines unnoticeable to improve the quality of light emission.

Figure 9:
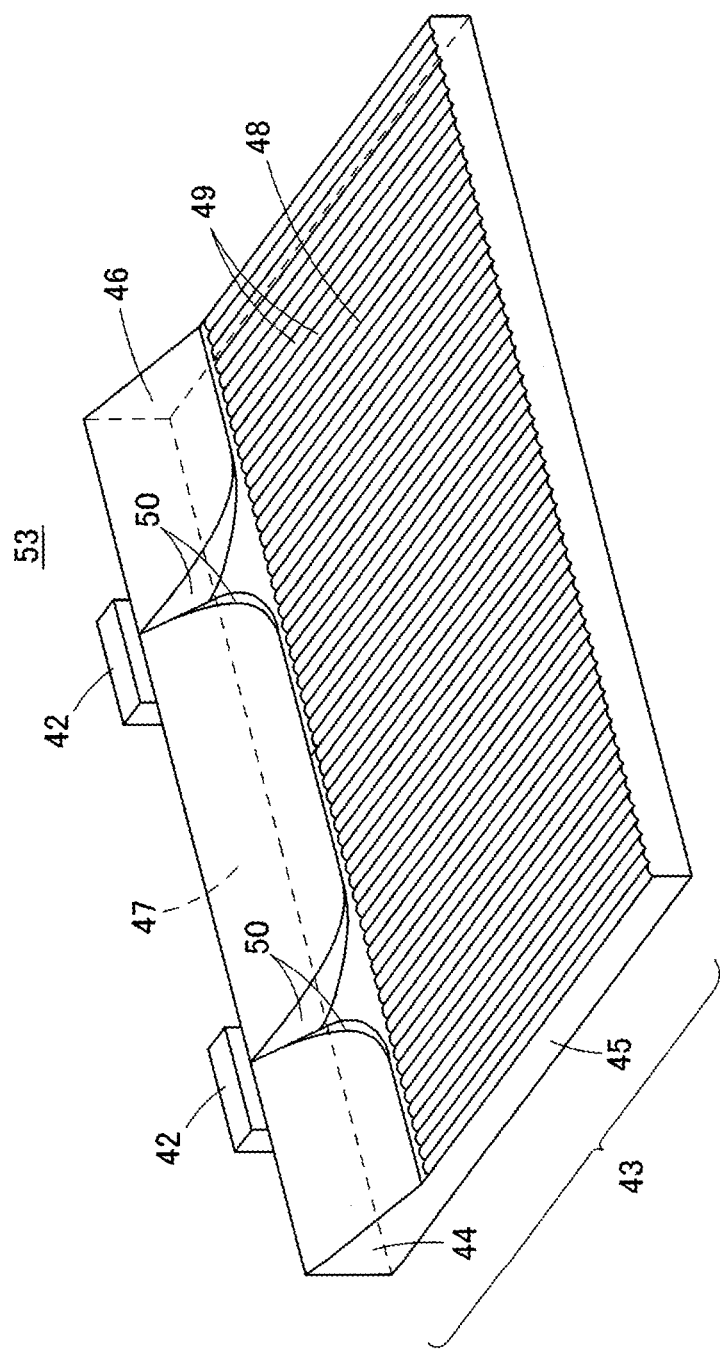
FIG. 9 is a perspective view illustrating the surface illumination device of the first embodiment, which uses a plurality of light sources.

The surface illumination device of the first embodiment may also support two or more light sources 42. When there are two, or more light sources 42, as illustrated in FIG. 9 the surface illumination device 53 may be provided with a pair of two cylindrical surfaces 50 along the front direction of each light source 42.

Figure 10A:
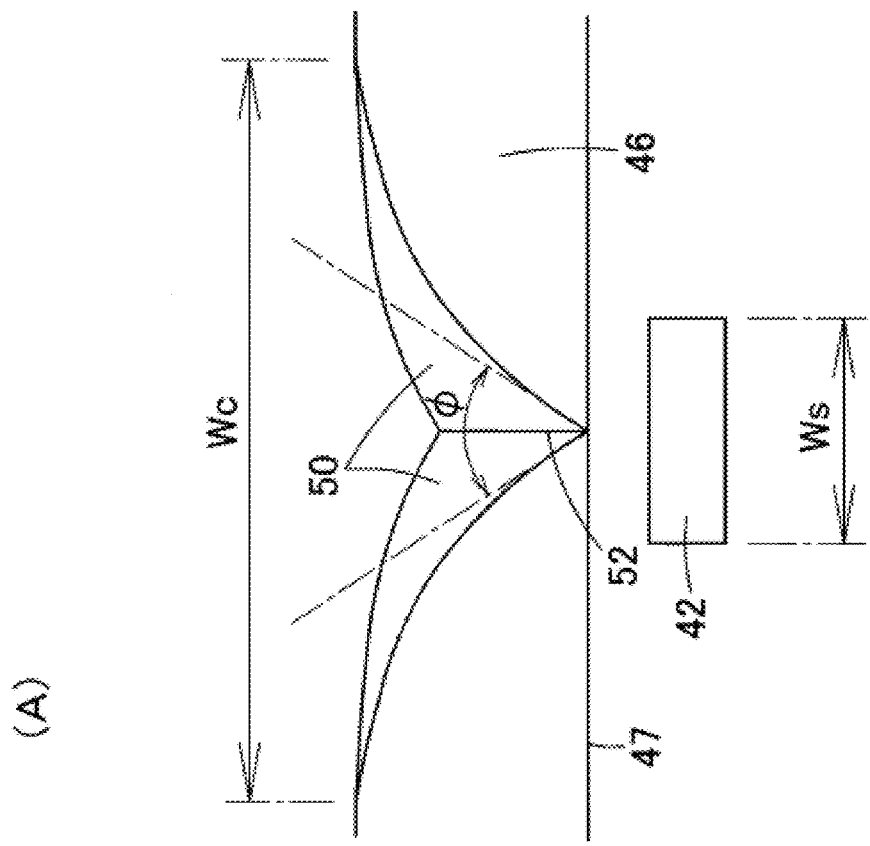
FIGS. 10A and 10B are diagrams for describing the design parameters of the surface illumination device according to the first embodiment.
Figure 10B:
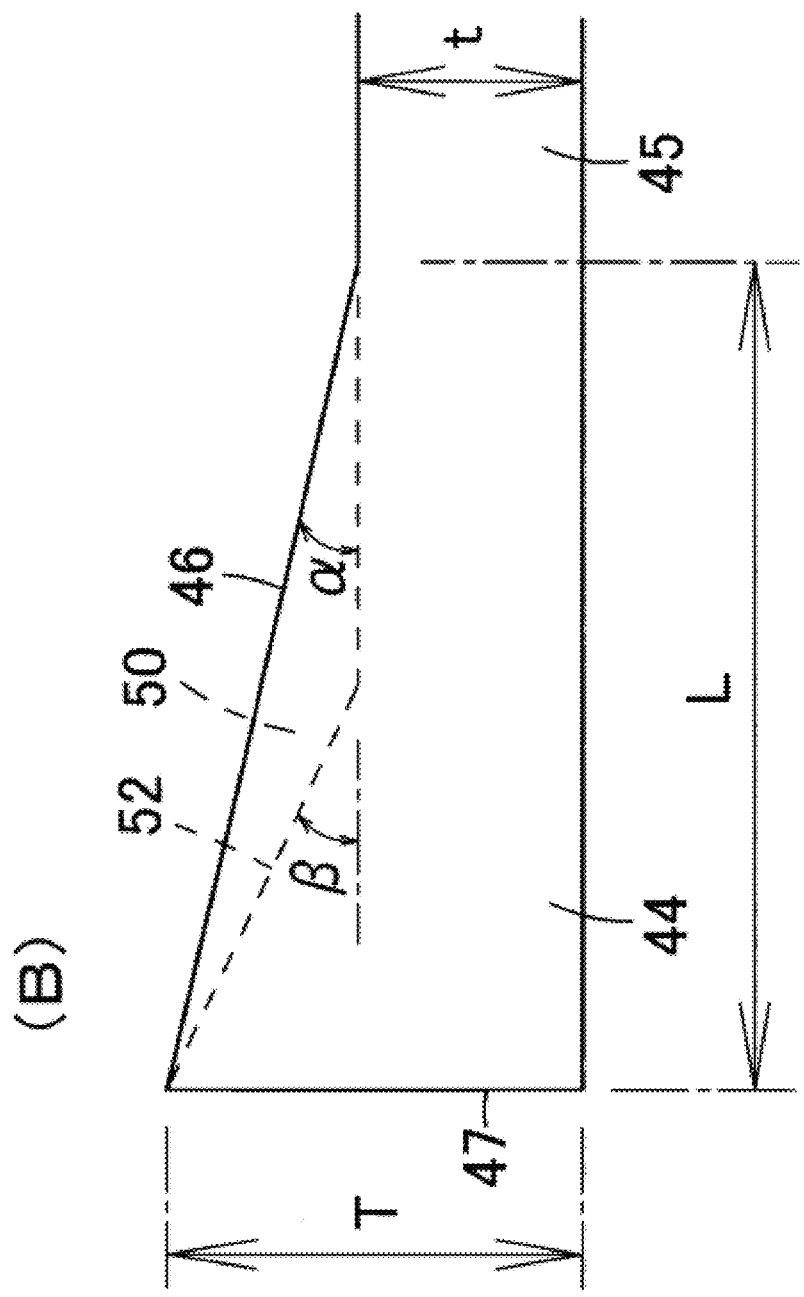
Figure 11:
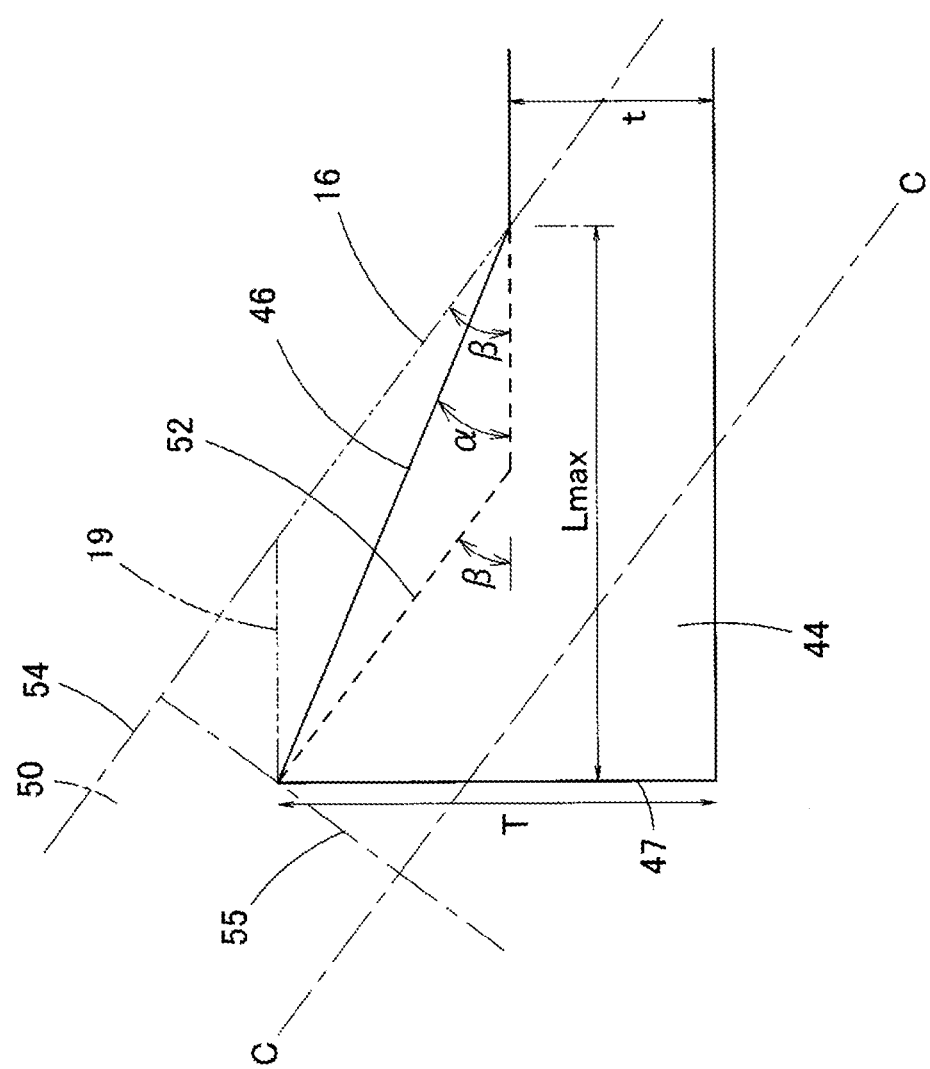
FIG. 11 is a schematic side view comparing the structures of a surface illumination device according to the first embodiment and a surface illumination device according to the cited reference.

Next, the design parameters for the slanted surface 46 and the cylindrical surfaces 50 in the surface illumination device 41, 53 of the first embodiment is describes with reference to FIGS. 10A, 10B, and FIG. 11. First, FIG. 10A is described. The width Wc of the intersecting cylindrical surfaces 50 is wider than the width Ws of the light output region (light output window) of the light source 42. In other words, Wc>Ws. Consequently, all the light output from the light source 42 in the front direction is reflected at the cylindrical surfaces 50. According to one or more embodiments of the present invention the radius of curvature r of the cylindrical surfaces 50 may be as small as possible; however, the relationship between the radius of curvature r and the width Wc according to one or more embodiments of the present invention may be 2r>Wc, so that the cylindrical surfaces 50 and the slanted surface 46 come together as smoothly as possible. According to one or more embodiments of the present invention, the cylindrical surfaces 50 illustrated in FIG. 10A intersect at an acute angle cp. Additionally, to reduce the angle of incidence of the light guided in the main light guiding body 45, the surface area of the slanted cylindrical surfaces 50 according to one or more embodiments of the present invention may be as large as possible; therefore the end (the upper end of the base line 52) of the cylindrical surfaces 50 according to one or more embodiments of the present invention reaches the upper end of the light input surface 47. To provide a numerical example, assume the width Ws of the light output region of the light source 42 equals 3.0 mm, the radius of curvature r of the cylindrical surfaces 50 equals 1.8 mm, and the width Wc of the cylindrical surfaces 50 equals 3.2 mm.

FIG. 11 is a schematic side view comparing the structures of the surface illumination device 41 according to the first embodiment and the surface illumination device 21 described in the cited reference. In FIG. 11, a dotted dashed line represents the cylindrical surfaces 50, which incline towards the light input surface at an angle β. A reference line C-C represents the axis center (central axis) of the cylindrical surfaces 50; a reference numeral 54 represents a line (ridge line) at the highest position generating the cylindrical surfaces 50; and a reference numeral 55 represents a cross section orthogonal to the axis center C-C. The base line 52 between the two cylindrical surfaces 50 is an intersection between the cylindrical surfaces 50. Additionally, in FIG. 11, the structure of the surface illumination device 21 described in the cited reference is outlined with a double-dotted dash line, while the structure of the first embodiment is outlined with a solid line. In the surface illumination device 21, the inclination of the slanted surface 16 is β, and is equal to the inclination β of the cylindrical surfaces 50; additionally a horizontal surface 19 is formed at the upper end of the slanted surface 16. Whereas, in the surface illumination device 41 according to the first embodiment, the inclination α of the slanted surface 46 is smaller than the inclination β of the cylindrical surfaces 50. In particular, the surface illumination device 41 does not include the horizontal surface 19 that is formed in the surface illumination device 21, and the upper end of the slanted surface 46 touches the upper end of the light input surface 47. Therefore, the inclination of the slanted surface 46 may be reduced without increasing the size of the light guide plate.

Now assume that the lower end of the slanted surface 46 (i.e., the horizontal straight line along the lower end of the slanted surface 46) touches the cylindrical surfaces 50 in the first embodiment. At this point, if the horizontal length of the light conducting portion 44 is taken as Lmax, the horizontal length Lmax can be represented as follows.

$$L\max=(T-t)/\tan\alpha$$

Here, t is the thickness of the main light guiding body 45, while T is the maximum thickness of the light conducting portion 44. The horizontal length L of the light conducting portion 44 must be shorter than the horizontal length Lmax. Therefore, using L≤Lmax in the above formula yields:

$$L\leq(T-t)/\tan\alpha$$

Accordingly, in the first embodiment the inclination α of the slanted surface 46 may be within the following range:

$$\beta<\alpha\leq\arctan[(T-t)/L]$$

Figure 12:
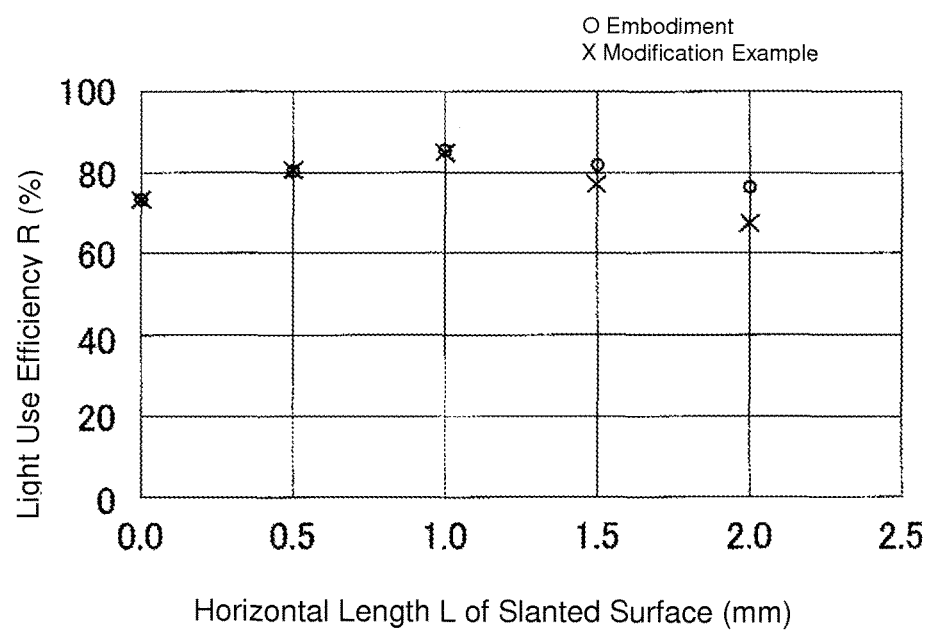
FIG. 12 is a diagram comparing the light use efficiency of a surface illumination device according to the first embodiment, and a surface illumination device according to the cited reference with a lenticular lens added thereto.

FIG. 12 is a diagram comparing the light use efficiency of the surface illumination device 41 according to the first embodiment, and the surface illumination device 21 according to the cited reference with a lenticular lens 32 added thereto (represented by the surface illumination device 31). In the graph, the circle represents the surface illumination device 41 according to the first embodiment, and the "x" represents the surface illumination device 31 of the comparative example. Additionally, assume here that when the horizontal length L of the slanted surface 46 is 0.5 mm, the cylindrical surfaces are inclined by 20.0°, the slanted surface 16 of the surface illumination device 31 has an inclination of 20.0°, and the slanted surface 46 of the surface illumination device 41 has an inclination of 16.5°. When the horizontal length L is 1.0 mm, the cylindrical surfaces are inclined by 25.2°, the inclination of the slanted surface 16 in the surface illumination device 31 is 25.2°, and the slanted surface 46 of the surface illumination device 41 has an inclination of 16.5°. When the horizontal length L is 1.5 mm, the cylindrical surfaces are inclined 33.7°, the slanted surface 16 in the surface illumination device 31 has an inclination of 33.7°, and the slanted surface 46 of the surface illumination device 41 has an inclination of 16.5°. Finally, when the horizontal length L is 2.0 mm, the cylindrical surfaces are inclined by 48.8°, the inclination of the slanted surface 16 in the surface illumination device 31 is 48.8°, and the slanted surface 46 of the surface illumination device 41 has an inclination of 16.5°. As can be understood from FIG. 12, the longer the horizontal length L of the slanted surface, the better the light use efficiency of the surface illumination device 41 of the first embodiment compared to the light use efficiency of the surface illumination device 31 of the comparative example.

Figure 1:
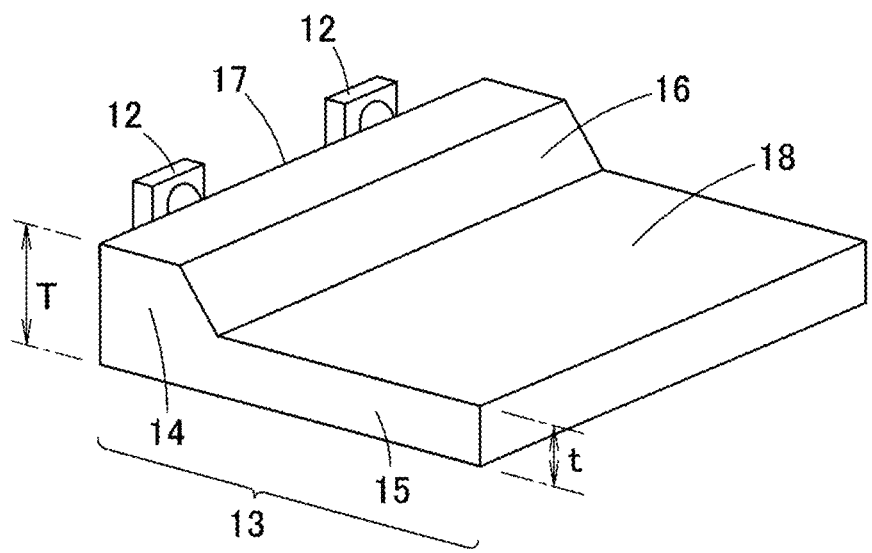
FIG. 1 is a perspective view of a conventional surface illumination device.
Figure 2A:
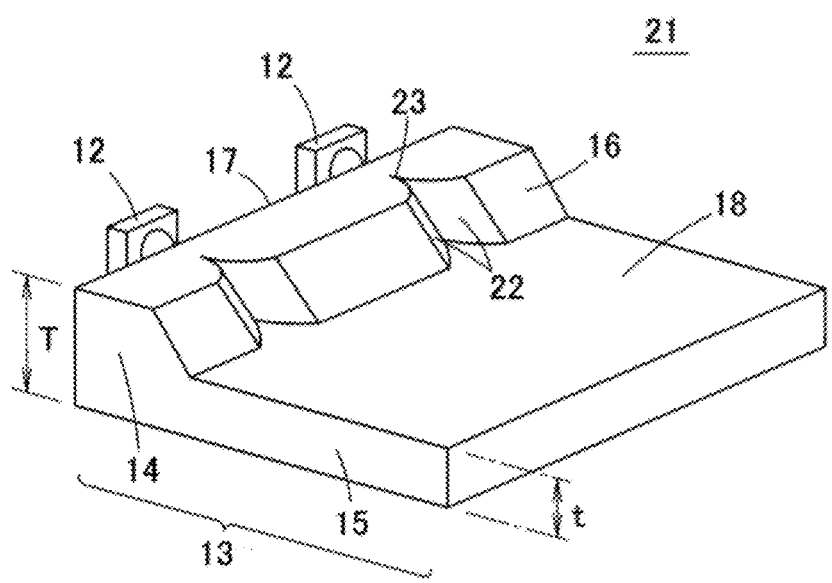
FIG. 2A is a perspective view of another conventional surface illumination device.
Figure 2B:
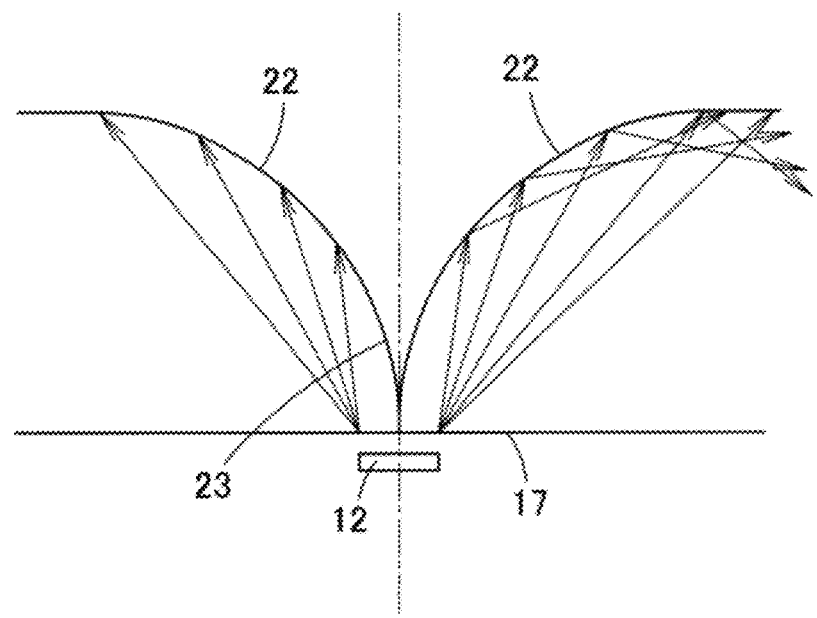
FIG. 2B is a schematic plan view illustrating the behavior of light near the light source of the surface illumination device depicted in FIG. 2A.
Figure 3:
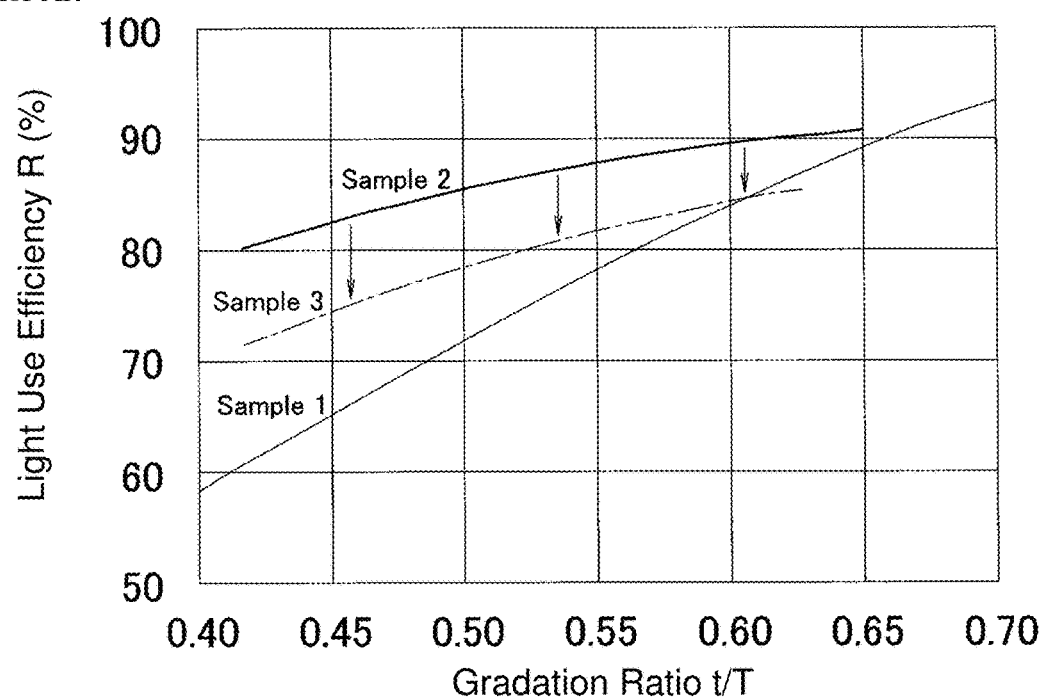
FIG. 3 is a graph comparing the light use efficiency of each surface illumination device illustrated in FIGS. 1, 2A, and 5 (Samples 1 to 3) respectively.
Figure 4:
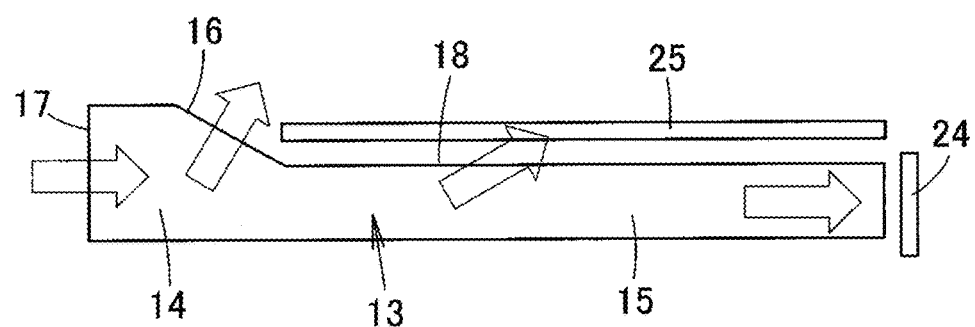
FIG. 4 is a diagram for explaining the placement of each optical detector that was used for the measurements shown in FIGS. 3 and 6C.
Figure 5:
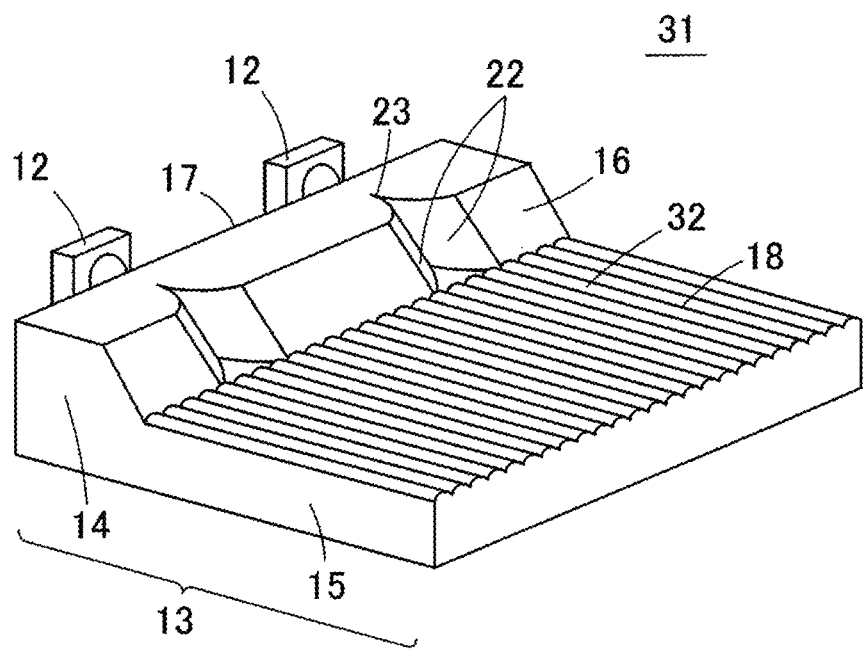
FIG. 5 is a perspective view illustrating the surface illumination device in FIG. 2A with a lenticular lens added thereto.
Figure 6B:
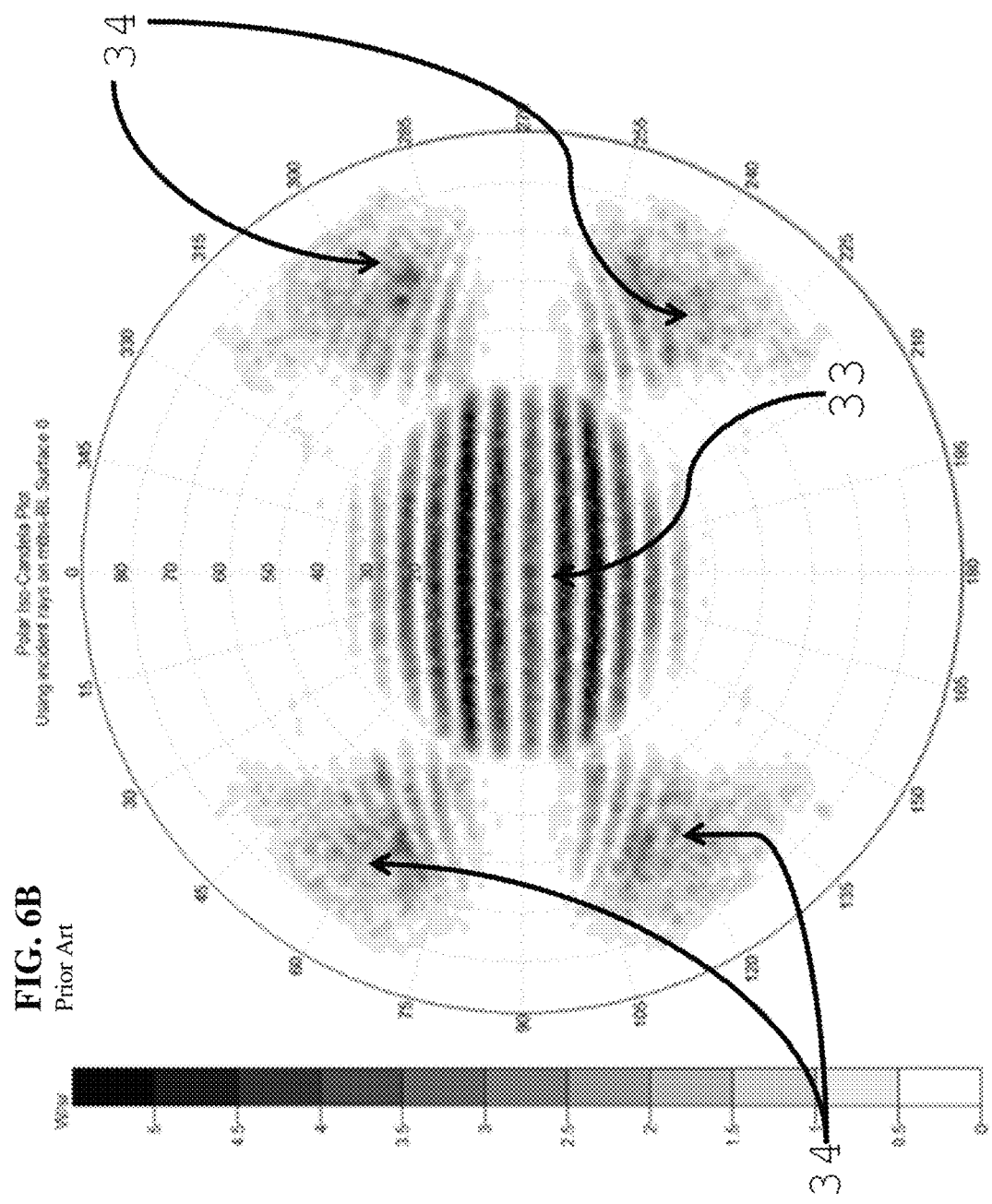
FIG. 6B illustrates the directivity of light within the main light guiding body of the surface illumination device in FIG. 5.
Figure 6C:
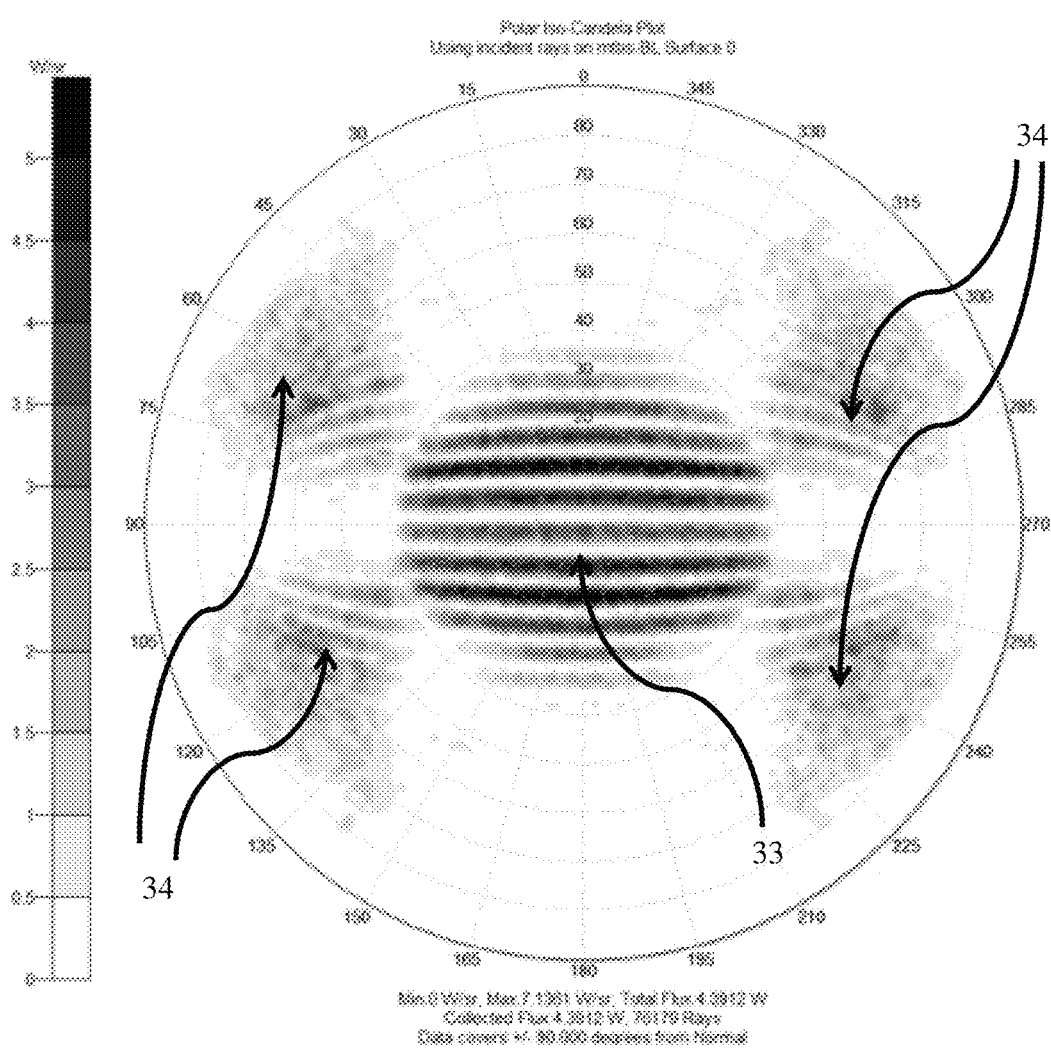
FIG. 6C illustrates the results of measuring the light leaking from a light output surface in the surface illumination device in FIG. 5, detected by the optical detector arranged opposite the light output surface as shown in FIG. 4.
Figure 13A:
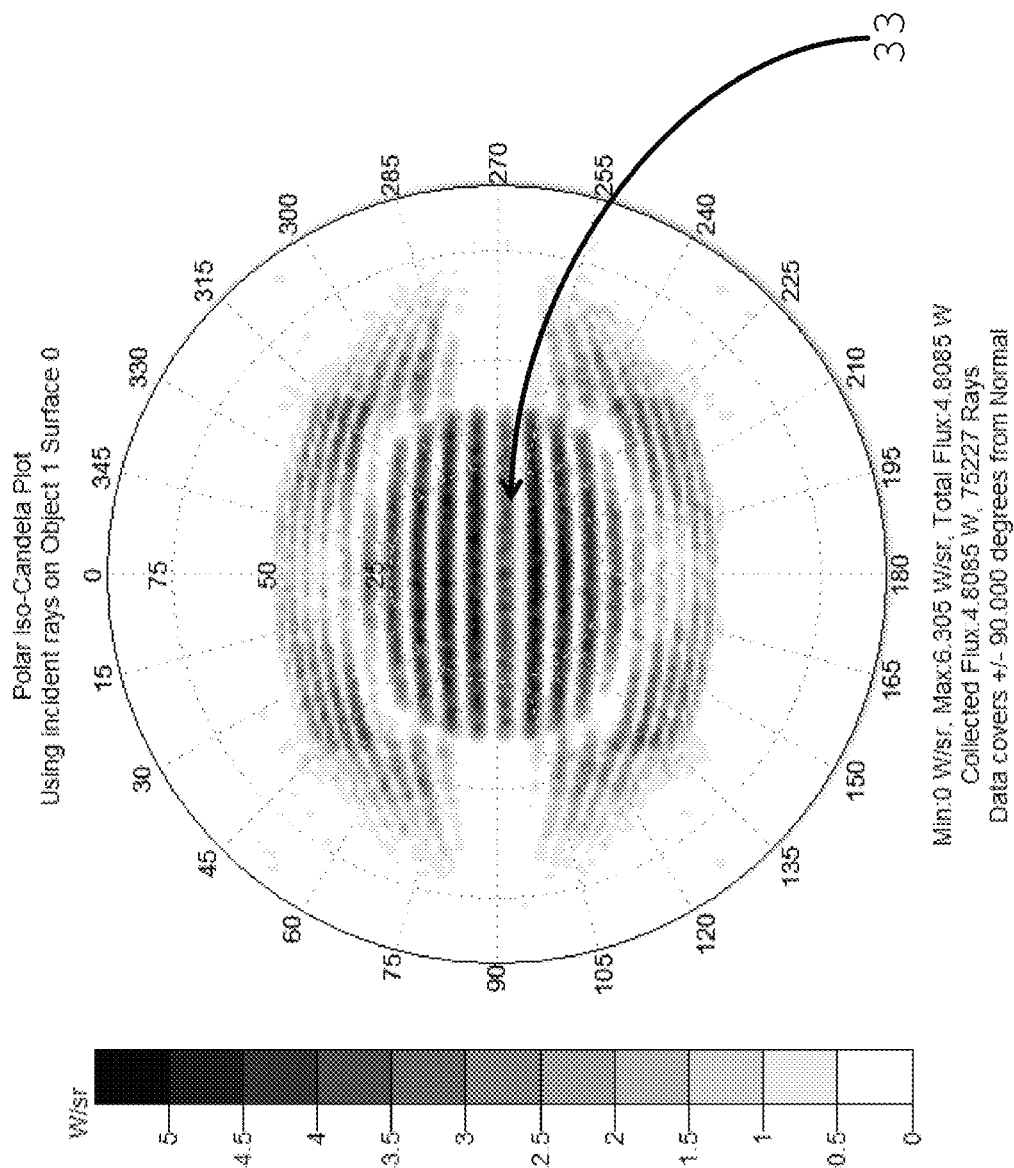
FIG. 13A shows the directivity of light within the main light guiding body of the surface illumination device according to the first embodiment when no lenticular lens is provided.
Figure 13B:
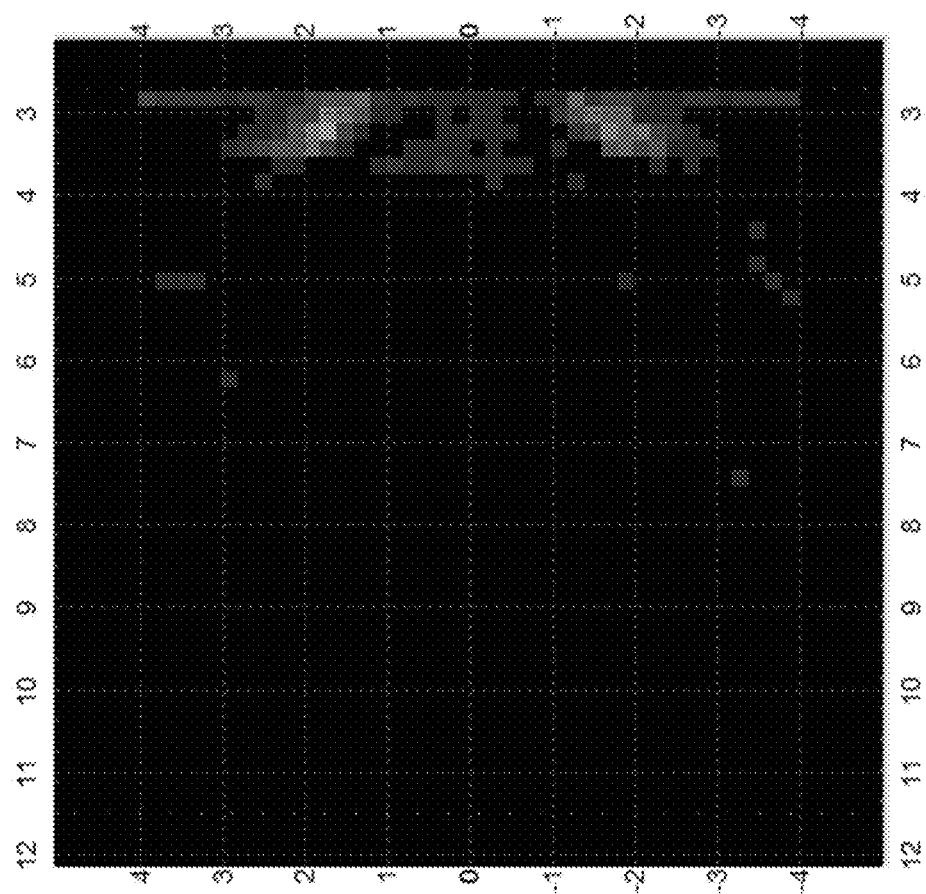
FIG. 13B shows the light leaking from the light output surface of the surface illumination device according to the first embodiment.
Figure 13C:
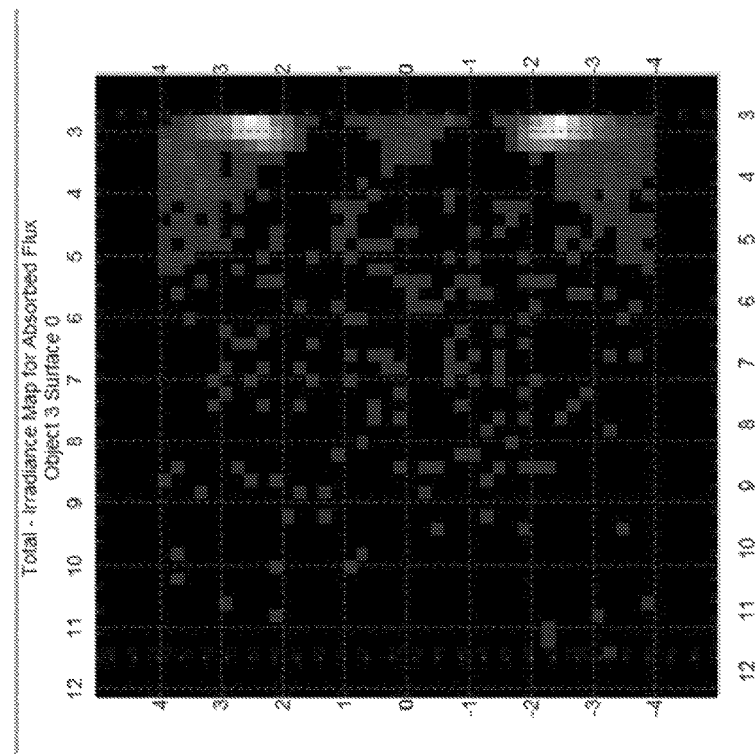
FIG. 13C illustrates the light leaking from the light output surface of the surface illumination device according to a conventional example.

FIG. 13A illustrates the directivity measured at the end surface of the light guide plate opposite the light input surface 47 in a surface illumination device 41 before adding the lenticular lens 49. Comparing FIG. 6A and FIG. 13A, it is clear that the obliquely-directed light 34 appears weaker in the surface illumination device 41 with no lenticular lens 49; therefore, the light will also tend not to leak from the lenticular lens 49 when the lenticular lens 49 is added to the surface illumination device 41. FIG. 13B illustrates the light that leaks from the light output surface 48 of the surface illumination device 41 as measured by the optical detector 25 in FIG. 4. FIG. 13C illustrates the light leaking from the light output surface of the surface illumination device 31 (the same measurements illustrated in FIG. 6C). Comparing FIG. 13B and FIG. 13C, it can be understood that the surface illumination device 41 according to the first embodiment reduces the amount of light leaking therefrom, and prevents the generation of bright lines.

Figure 14:
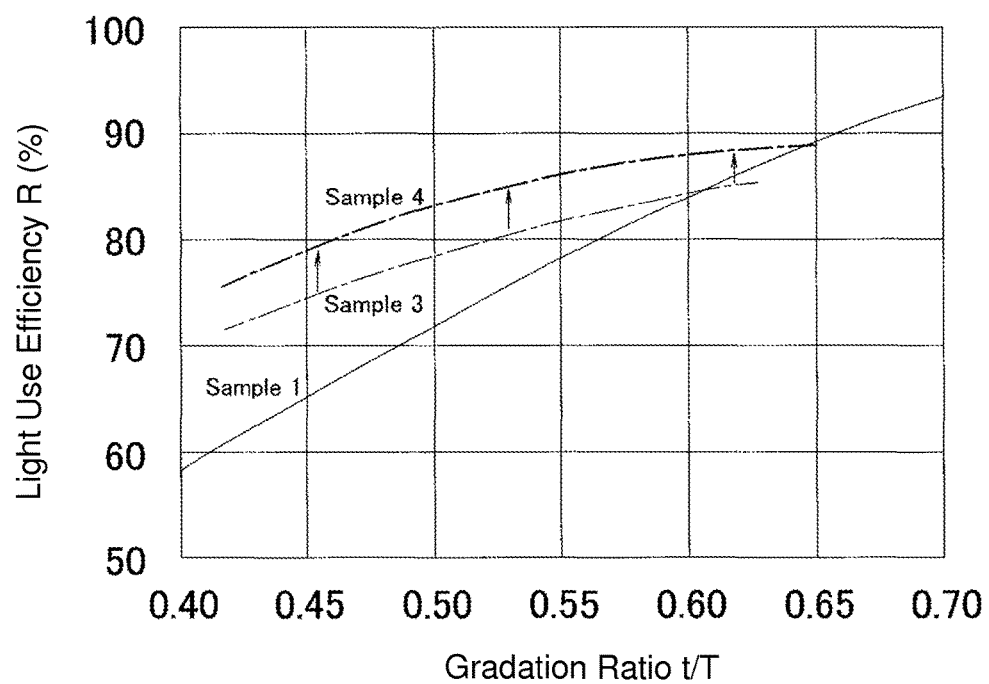
FIG. 14 illustrates the light use efficiency of the surface illumination device according to the first embodiment (Sample 4)

Sample 4 illustrated in FIG. 14 represents the results of measuring the light use efficiency of the surface illumination device 41. As can be seen in FIG. 14, the reduced light use efficiency in Sample 3 (surface illumination device 31) due to adding the lenticular lens 32 to the surface illumination device 21 may be improved upon given the features of the first embodiment.

Second Embodiment

Figure 15A:
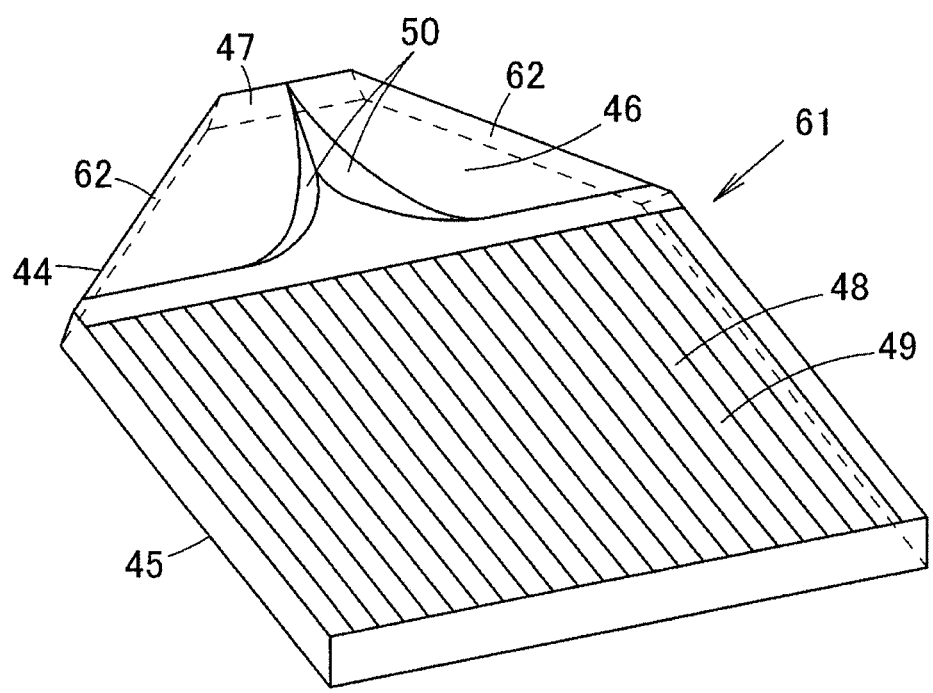
FIG. 15A is a perspective view illustrating a light guide plate according to a second embodiment.
Figure 15B:
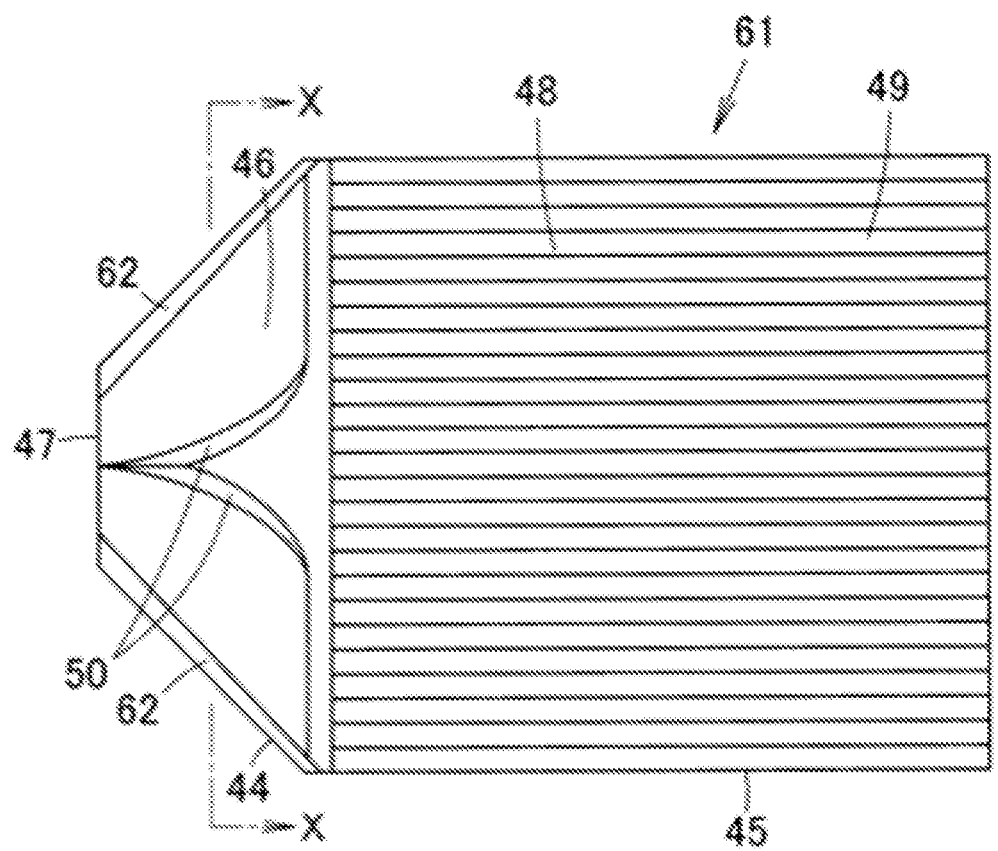
FIG. 15B is a plan view of the light guide plate in FIG. 15A.

FIGS. 15A and 15B are respectively a perspective and a plan view illustrating a light guide plate 61 according to a second embodiment. FIG. 16A is a cross-sectional view along the line X-X in FIG. 15B. Both side surfaces of the light conducting portion 44 are cut diagonally in the light guide plate 61 according to the second embodiment. The surfaces that are cut diagonally become light reflecting walls 62. Note that other portions of the structure are identical to the light guide plate in the first embodiment. Therefore the portions identical to those in the first embodiment are given the same reference numerals, and further explanation thereof is omitted.

In the light guide plate 61, the light is reflected transversely by the cylindrical surfaces 50, and repeatedly reflected on the upper and lower surfaces of the light conducting portion 44 until reaching the side surfaces of the light conducting portion 44. This light is subsequently reflects on the light reflecting wall 62 and returns to the center of the light guide plate 61 as illustrated in FIG. 16A. As a result, light is less likely to leak from the side surfaces of the light guide plate 61 and the light use efficiency therefore improves.

Additionally, the light reflecting wall 62 may be inclined relative to the lower surface of the light guide plate 61 from an orthogonal direction. That is, as illustrated in FIG. 16A, the light reflecting wall 62 may be inclined to form an angle γ with the lower surface of the light guide plate 61. Here, the angle γ (inclination) of the light reflecting wall 62 is less than 90°, and may be, for example, between 60° to 75° inclusive.

The light guided by the light conducting portion 44 is reflected on the slanted surface 46 to thereby increase the directivity of the light within a plane orthogonal to the light output surface 48. Therefore, the light reflected at the slanted surface 46 has a small incident angle when incident on the upper and the lower surface of the main light guiding body 45, and tends not to leak from the main light guiding body 45 even without reflecting at the optical patterns formed thereon. Whereas, when the light reflecting wall 62 is inclined, the light totally reflected by the light reflecting wall 62 narrowly directed within a plane orthogonal to the light output surface 48. Thus, the light reflected at the light reflecting wall 62 has a large incident angle when incident on the upper and the lower surface of the main light guiding body 45, reducing the amount of light leaking from the main light guiding body 45.

Figure 16B:
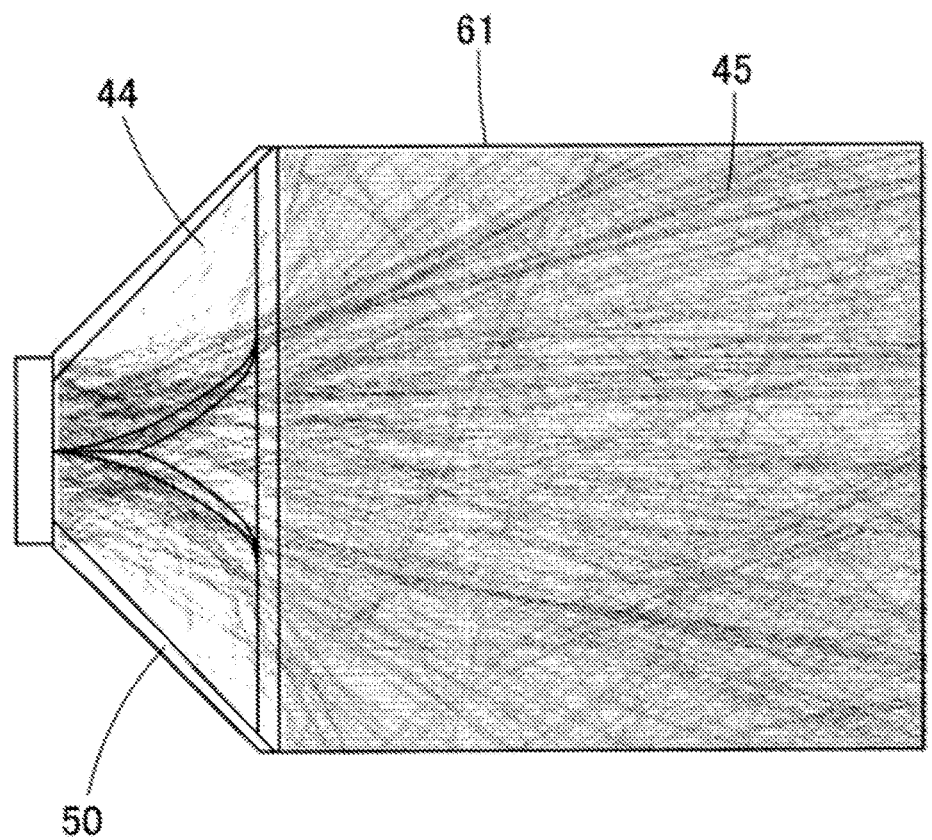
FIG. 16B illustrates the behavior of light incident on the light guide plate in FIG. 15A.

FIG. 16B illustrates the behavior of light in the light guide plate 61, which includes a light reflecting wall 62. According to FIG. 16B, clearly, a small amount of light leaks from the side surface of the light conducting portion 44 due to providing the light reflecting wall 62.

Possible Modifications to the Second Embodiment

Figure 17A:
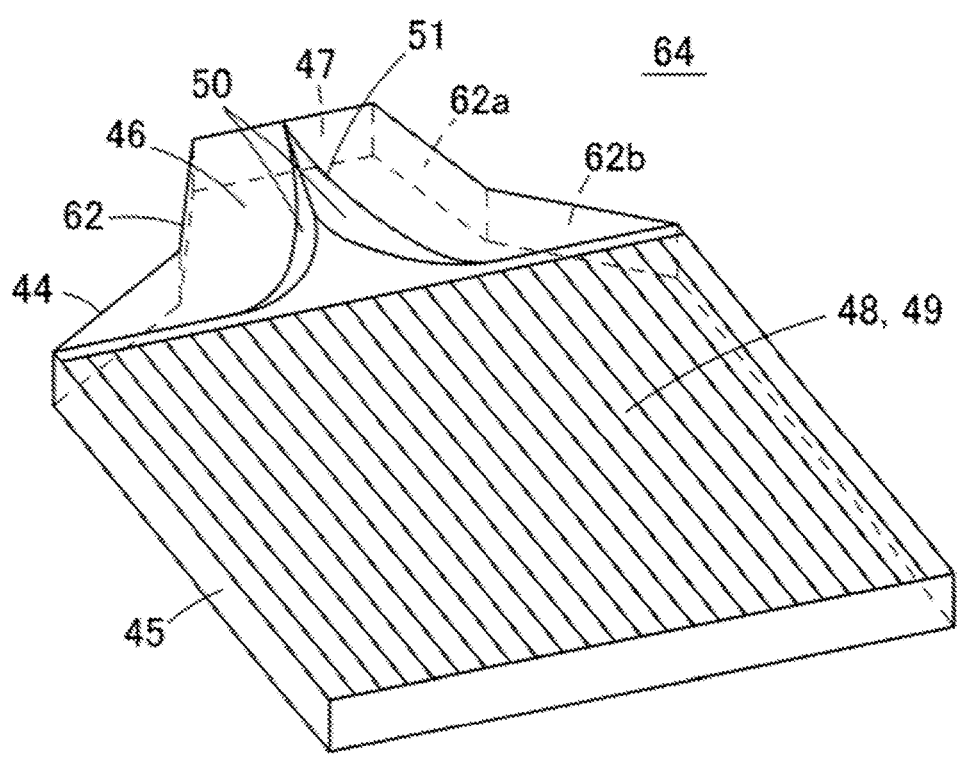
FIG. 17A is a perspective view illustrating a first modification example for the light guide plate according to the second embodiment.
Figure 17B:
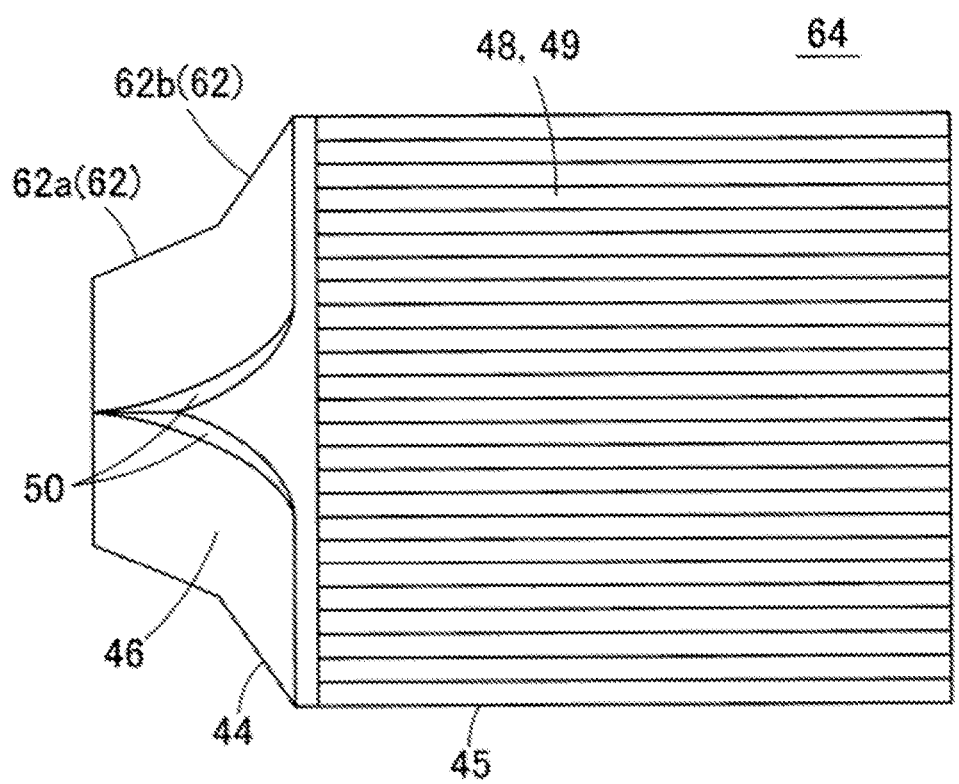
FIG. 17B is a plan view of the light guide plate in FIG. 17A.

FIG. 17A is a perspective view illustrating a light guide plate 64, which is a first modification example for a light guide plate according to the second embodiment. FIG. 17B is a plan view of the light guide plate 64; the light guide plate 64 includes a light reflecting wall 62 at the side surface of the light conducting portion 44, and the light reflecting wall 62 is curved. The light reflecting wall 62 is made from two flat surfaces, a light reflecting wall 62a that is positioned near the light input surface, and a light reflecting wall 62b that is positioned far away from the light input surface 47. When viewed orthogonally from above, the inclination of the light reflecting wall 62a relative to the side surface of the main light guiding body 45 is smaller than the inclination of the light reflecting wall 62b relative to the side surface of the main light guiding body 45.

Figure 18:
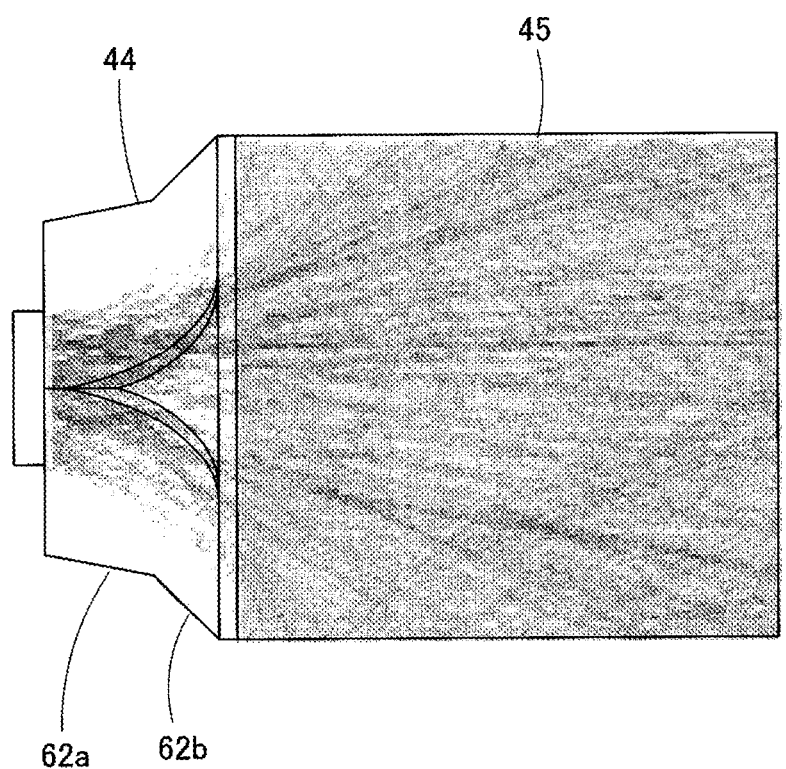
FIG. 18 illustrates the behavior of light incident on the light guide plate in FIG. 17A.

As illustrated in FIG. 18, the light that is spread transversely and is reflected by the light reflecting wall 62 returns to the center of the light guide plate, even when the light reflecting wall 62 is bent.

Figure 19A:
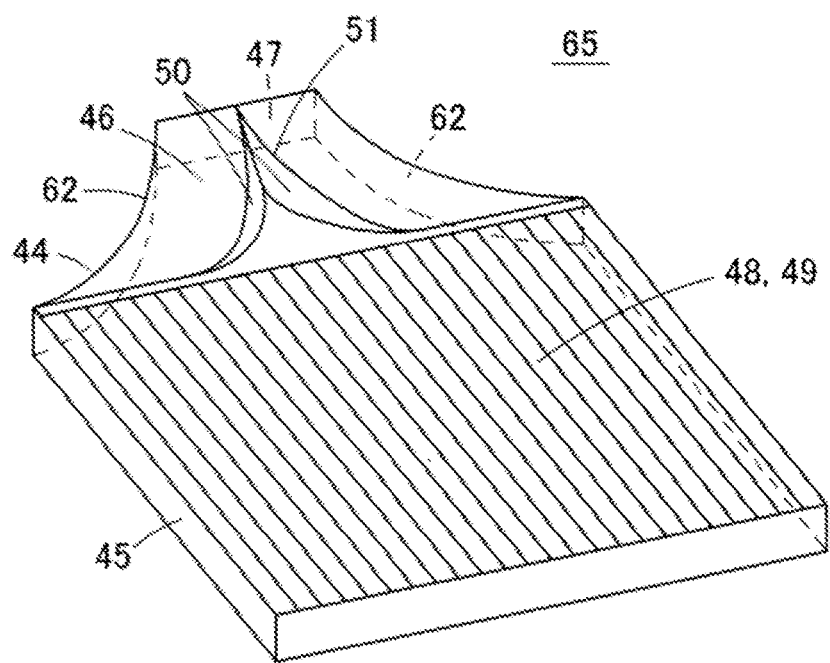
FIG. 19A is a perspective view illustrating a second modification example for the light guide plate according to the second embodiment.
Figure 19B:
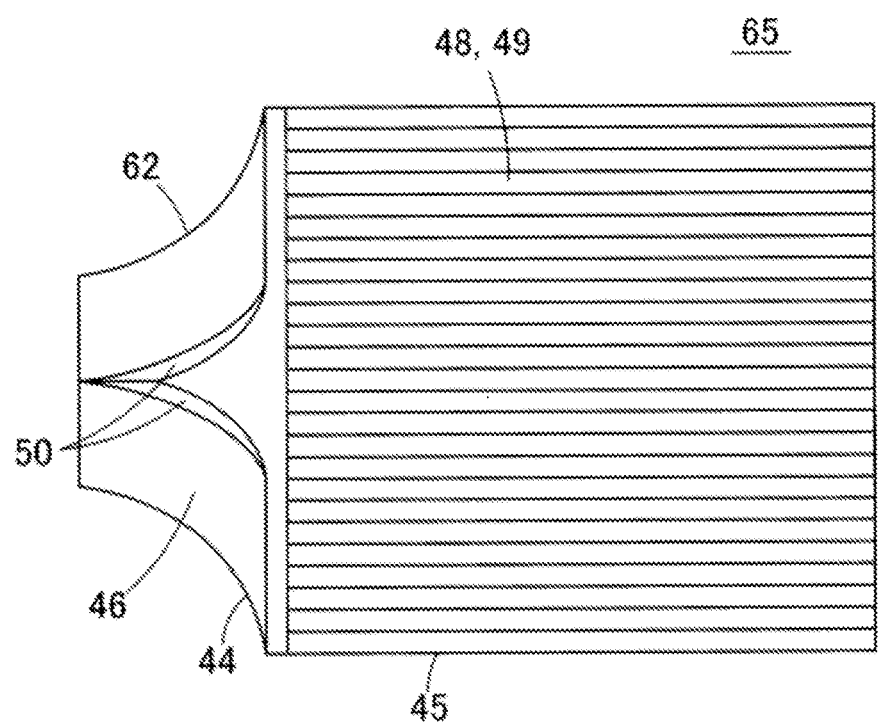
FIG. 19B is a plan view of the light guide plate in FIG. 19A.
Figure 20:
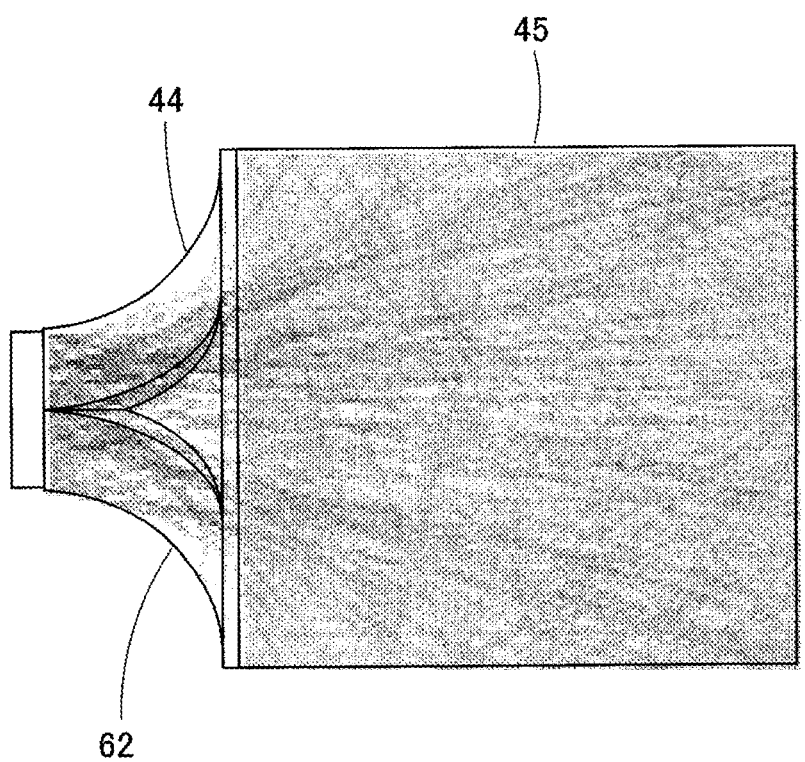
FIG. 20 illustrates the behavior of light incident on the light guide plate in FIG. 19A.

As exemplified by a light guide plate 65 illustrated in FIGS. 19A and 19B, the light guide plate 65 includes a light reflecting wall 62 configured by a curved surface. The light reflecting wall 62 may appear curved when viewed orthogonally from above. The light spread transversely and reflected by the light reflecting wall 62 returns to the center of the light guide plate even when the light reflecting wall 62 is bowed as illustrated in FIG. 20.

Third Embodiment

Figure 21A:
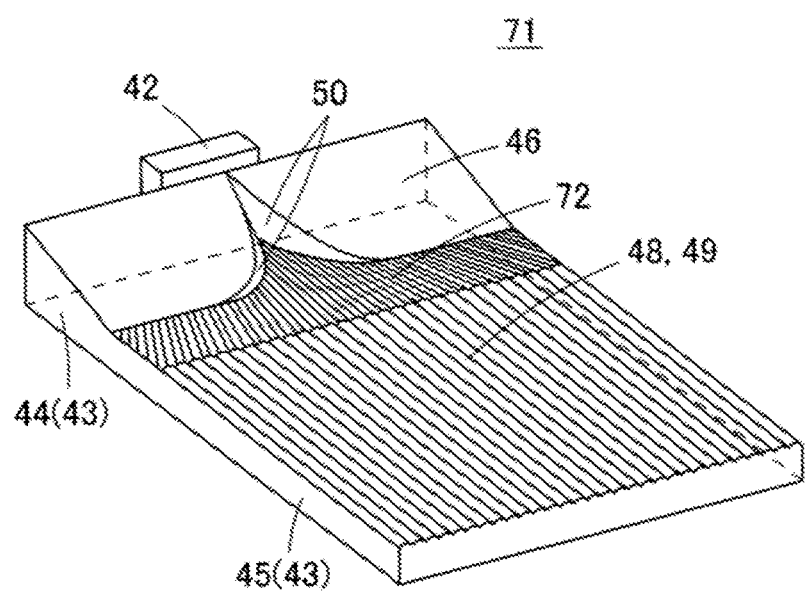
FIG. 21A is a perspective view of a surface illumination device according to a third embodiment.
Figure 21B:
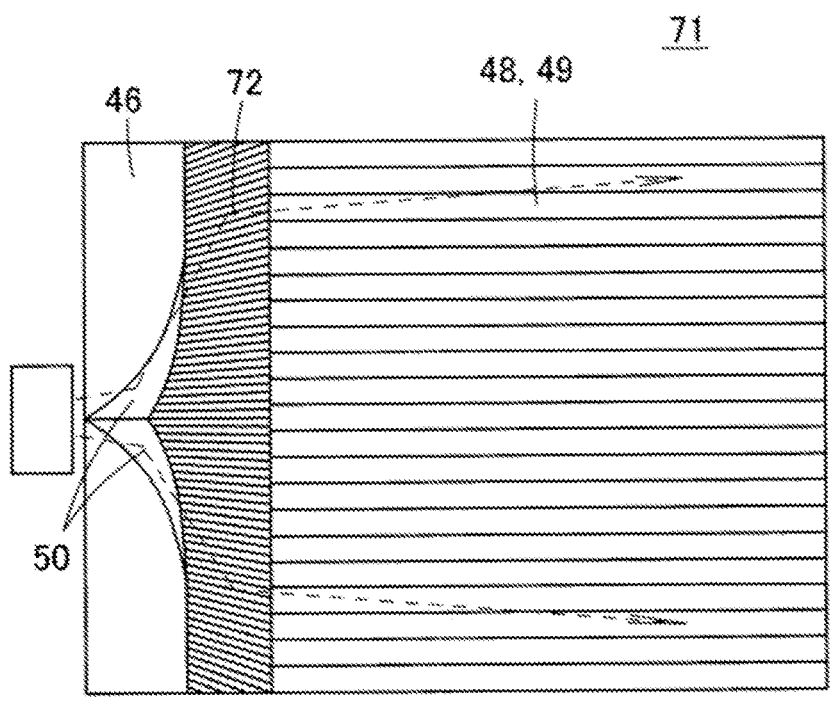
FIG. 21B is a plan view of the light guide plate in FIG. 21A.

FIG. 21A is a perspective view illustrating a surface illumination device 71 according to a third embodiment; and FIG. 21B is a plan view of the surface illumination device 71. The surface illumination device 71 is provided with a directivity conversion pattern 72 in a region between the slanted surface 46 and the lenticular lens 49.

As illustrated in FIGS. 21A and 21B, the directivity conversion pattern 72 is a plurality pattern elements 73 arranged as V-grooves along the radiation direction. That is, when viewed from a direction orthogonal to the light output surface 48, each of the pattern elements 73 pass through the light emission center of the light source 42, and is inclined relative to an imaginary straight line perpendicular to the light input surface 47 (referred to below as an optical axis K of the light source 42). Further, each of the pattern elements 73 on either side of the optical axis K is inclined in the opposite direction. Moreover, the angle each of the pattern elements 73 forms with the optical axis K increases gradually as the distance thereof from the optical axis K increases.

Figure 22:
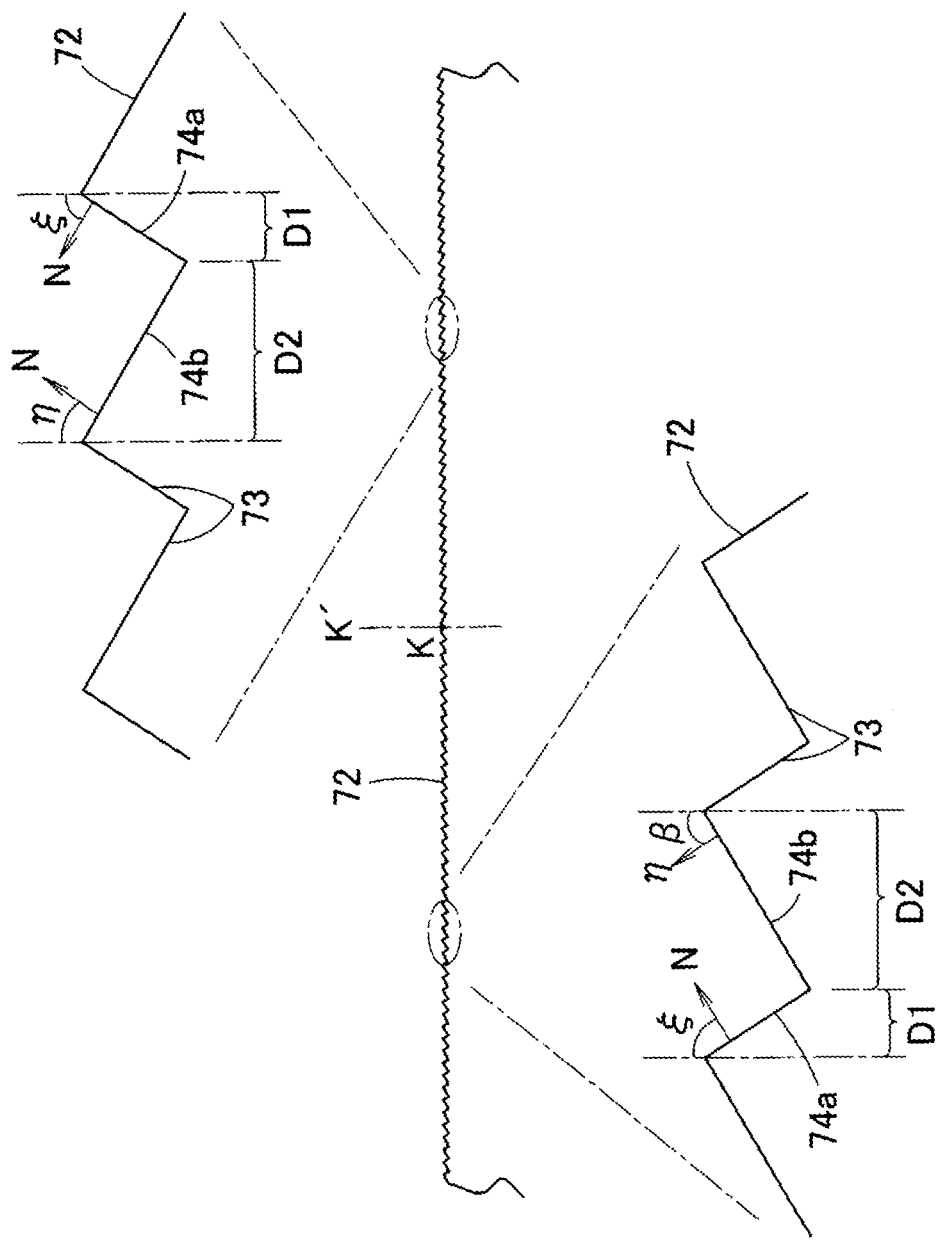
FIG. 22 is a cross-sectional view illustrating the shape of a directivity conversion pattern in a cross-section parallel to the light input surface, and an exploded partial view thereof.

As illustrated in FIG. 22, each of the pattern elements 73 contains two inclined surfaces having different inclinations and inclination directions on a cross-section parallel to the light input surface 47. Each of the pattern elements 73 creates a V-groove with asymmetrical left and right sides. Accordingly, the directivity conversion pattern 72 is configured such that the inclined surfaces with different inclination directions are arranged next to each other.

The cross-sectional shape of the directivity conversion pattern 72 has the following features. Taking a cross section parallel to the light input surface 47, consider a normal line N projecting from the inside to the outside of the light guide plate 43 from the inclined surface of each of the pattern elements 73. An inclined surface 74b is inclined in an opposite direction from a perpendicular line K' where the normal line N is orthogonal to the optical axis K. Further, an inclined surface 74a is inclined in the same manner as the normal line N is inclined toward the perpendicular line K'. Here, the total of a transverse width D2 of the inclined surface 74b is greater than the total of a transverse width D1 of the inclined surface 74a. However, the total of the transverse width D2 of the inclined surface 74b and the transverse width D1 of the inclined surface 74a are individually calculated for the regions on the left and the right of the optical axis K respectively. Further the total of the transverse widths D2 of each of the inclined surfaces 74b on both sides of the optical axis K, is greater than the total of the transverse widths D1 of the inclined surfaces 74a. In the example illustrated in FIG. 22, observing two arbitrary locations where the inclined surfaces 74a, 74b are adjacent in particular, the transverse width D2 of the inclined surface 74b where the normal line N is inclined in a direction opposite the perpendicular line K' is greater than the transverse width D1 of an inclined surface 74a inclined where the normal line N is inclined towards the perpendicular line K'.

The cross-sectional shape of the directivity conversion pattern 72 may also be expressed in the following manner. Consider an angle between the normal line N projecting from the inclined surface 74a inclined along the perpendicular line K' is an angle ξ, and an angle between the normal line N projecting from the inclined surface 74b in a direction opposite the perpendicular line K' and the perpendicular line K' is an angle η. The average of the angle ξ (or, of the inclination of the inclined surface 74a) is greater than the average of the angle η (or, of the inclination of the inclined surface 74b). Here, given an angle between the normal line N projecting from an inclined surface 74a inclined along the perpendicular line K' is an angle ξi and the width of each of the inclined surfaces 74a is D1i, and "i" is an index assigned to each inclined surface 74a, the average of the angle ξ which is the angle between the normal line N projecting from the inclined surface 74a inclined along the perpendicular line K' is defined by the following formula.

$$\Sigma \xi i \times D1i / \Sigma D1i$$

Furthermore, the summation for the numerator and denominator are both calculated for the inclined surfaces 74a in the regions on the right and on the left of the optical axis K. Similarly, given an angle between the normal line N projecting from an inclined surface 74b and inclined opposite to the perpendicular line K' is an angle ηj and the width of each of the inclined surfaces 74b is D2j, and "j" is an index assigned to each inclined surface 74b, the average of the angle η which is the angle between the normal line N projecting from the inclined surface 74b and inclined opposite to the perpendicular line K' is defined by the following formula.

$$\Sigma \eta j \times D2j / \Sigma D2j$$

Furthermore, the summation for the numerator and denominator are both calculated for the inclined surfaces 74b in the region on the right and the left of the optical axis K. Additionally, the sizes of the average angles are compared individually for the regions on the right and on the left of the optical axis K. In the example illustrated in FIG. 22, observing two arbitrary locations where the inclined surfaces 74a, 74b are adjacent in particular, the angle 4 between the normal line N projecting from the inclined surface 74a along the perpendicular line K' is greater than the angle η between the normal line N projecting from the inclined surface 74b in a direction opposite the perpendicular line K'.

Thus, in the surface illumination device 71, the light output from the light source 42 enters the light conducting portion 44 from the light input surface 47, is reflected at the upper and lower surfaces of the light conducting portion 44, or is transmitted through the light conducting portion 44 and guided to the thin main light guiding body 45. The light guided to the main light guiding body 45 reflects at the directivity conversion pattern 72, the lenticular lens 49 or the lower surface of the main light guiding body 45 while being guided into the main light guiding body 45. The light is further reflected or diffused by an optical pattern and is substantially uniform when exiting from the light output surface 48.

Figure 23A:
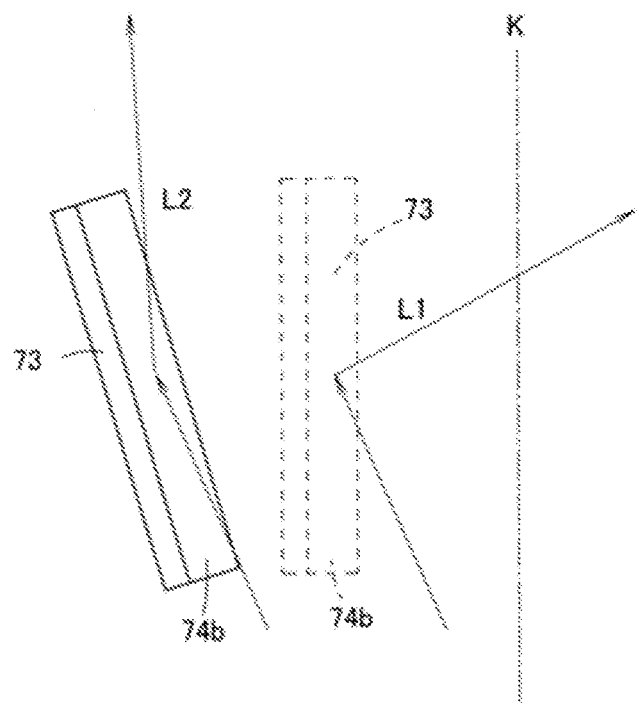
FIGS. 23A and 23B are diagrams for explaining the effects of a directivity conversion pattern.
Figure 23B:
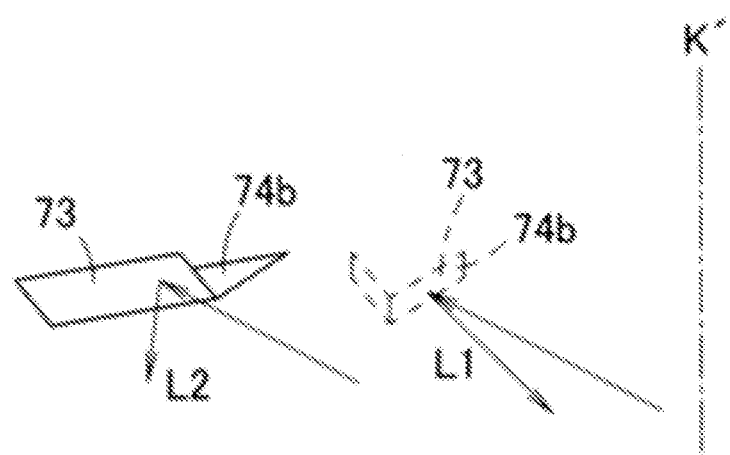

At this point the light incident on the directivity conversion pattern 72, reflects at the directivity conversion pattern 72 and bends close to parallel to the optical axis K, and thus becomes light forming a smaller angle with the optical axis K as illustrated in FIG. 21B. FIGS. 23A and 23B show the behavior of the light L2 reflected by the directivity conversion pattern 72. FIG. 23A illustrates the light guide plate 43 when the light guide plate is viewed orthogonally from above, and FIG. 23B illustrates the light input surface 47 when viewed orthogonally (when viewed from the light source 42).

As illustrated by the dotted lines in FIGS. 23A and 23B, when the pattern elements 73 are arranged parallel to the optical axis K, the light L1 reflected on the inclined surface 74b spreads transversely and may disadvantageously leak from the side surface of the light guide plate 43 or the lenticular lens 49.

In contrast, in the surface illumination device 71 according to the third embodiment, the directivity conversion pattern 72 is arranged inclined relative to the optical axis K as illustrated by the solid lines in FIGS. 23A and 23B. Therefore, when viewed orthogonally from above, the light L2 reflected by the inclined surface 74b in the pattern elements 73 is reflected almost parallel to the optical axis K and the light rays are oriented toward the front. As a result, the light reflected by the pattern elements 73 tend not to reach the side surfaces of the light guide plate 43 in the surface illumination device 71 according to the third embodiment. Additionally, the aforementioned light tends not to strike the lenticular lens 49 from a transverse direction. Consequently, the amount of light leaking from the side surfaces of the light guide plate 43 and the lenticular lens 49 is reduced, improving the light use efficiency and improving the emission luminance of the surface illumination device 71.

Figure 24:
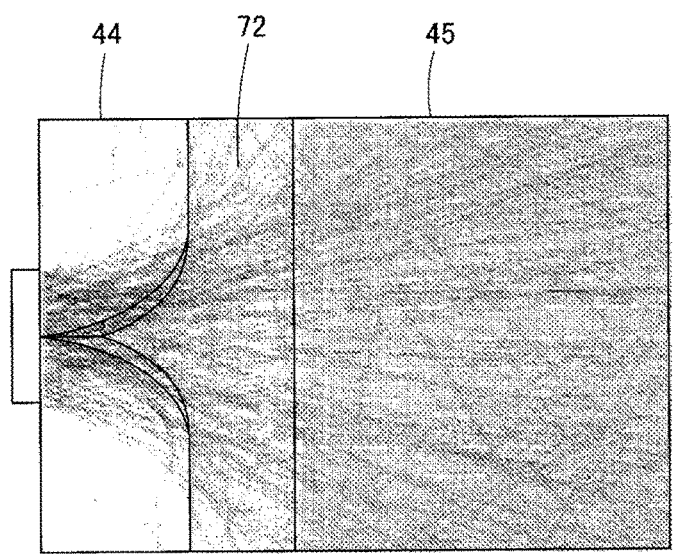
FIG. 24 illustrates the behavior of light incident on the light guide plate in FIG. 21A.

FIG. 24 shows the behavior of the light in the surface illumination device 71 according to the third embodiment. FIG. 24 illustrates the direction of the light inside the light guide plate 43.

Fourth Embodiment

Figure 25:
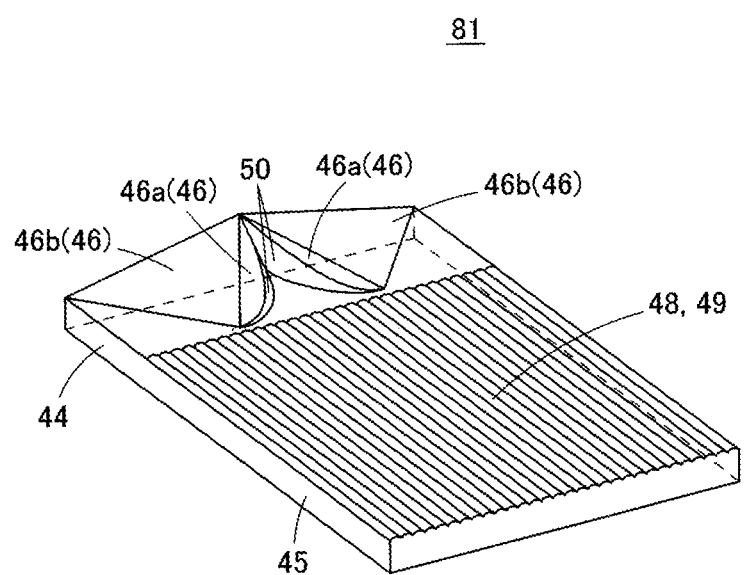
FIG. 25 is a perspective view illustrating a light guide plate according to a fourth embodiment.

FIG. 25 is a perspective view illustrating a light guide plate 81 according to a fourth embodiment. The slanted surface 46 in the light guide plate 81 includes a plurality of regions 46a, 46b having different inclination directions. Namely, the slanted surface 46 is divided into two regions 46a, 46b by a straight line connecting the upper end and the lower end of the groove 51. The region 46a of the slanted surface 46 closest to the cylindrical surfaces 50 slants downwards toward the main light guiding body 45. The region 46b of the slanted surface 46 further away from the cylindrical surfaces 50 slants downward toward a direction midway between the main light guiding body 45 and the side surface of the light conducting portion 44. The bound line between a region 46a and a region 46b is the straight line connecting the upper end and the lower end of a cylindrical surface 50. Consequently, the light spread transversely by the cylindrical surfaces 50 is reflected downward by the slanted surface 46 and tends not to leak from the side surfaces of the light guide plate 81.

Figure 26:
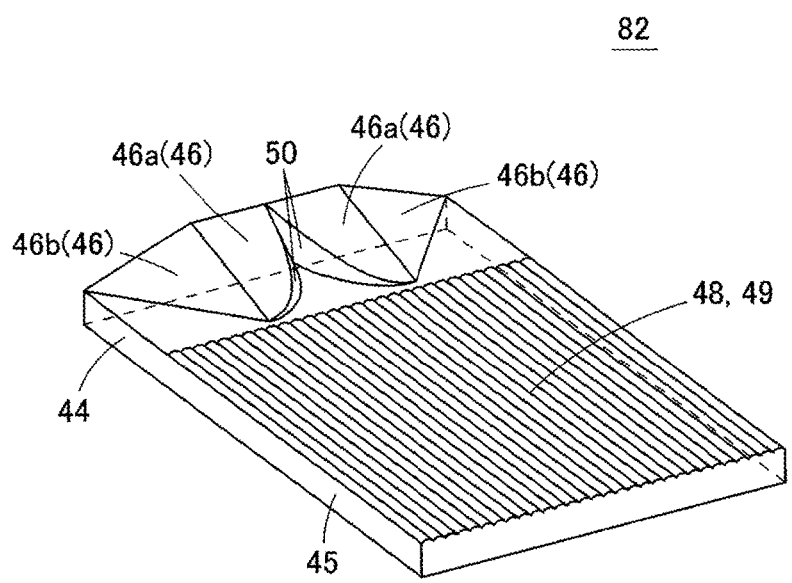
FIG. 26 is a perspective view illustrating a first modification example for the light guide plate according to the fourth embodiment.

FIG. 26 illustrates a light guide plate 82 as an example for modifying the fourth embodiment. The slanted surface 46 in the light guide plate 82 is divided into two regions 46a, 46b by a straight line parallel to the side surfaces of the light guide plate 82 when the light guide plate 82 is viewed orthogonally from above. The region 46a of the slanted surface 46 close to the cylindrical surfaces 50 slants downwards toward the main light guiding body 45. The region 46b of the slanted surface 46 further away from the cylindrical surfaces 50 slants downward toward a direction midway between the main light guiding body 45 and the side surface of the light conducting portion 44. The bound line between the region 46a and the region 46b is a straight line parallel to the side surfaces of the light guide plate 82 when the light guide plate 82 is viewed orthogonally from above.

Figure 27:
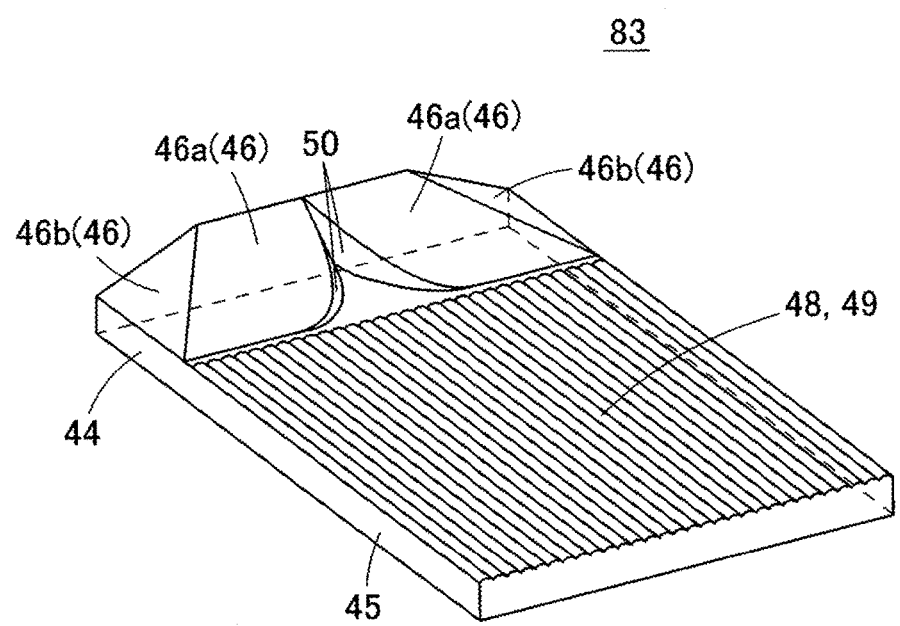
FIG. 27 is a perspective view illustrating a second modification example for the light guide plate according to the fourth embodiment.

Alternatively, as exemplified by a light guide plate 83 illustrated in FIG. 27, the slanted surface 46 may be formed so that only the region 46b located on both sides on the upper surface of the light conducting portion 44 inclines downward toward the side surfaces of the light conducting portion 44. Beyond that, the region 46a may incline downward toward the main light guiding body 45.

Fifth Embodiment

Figure 28A:
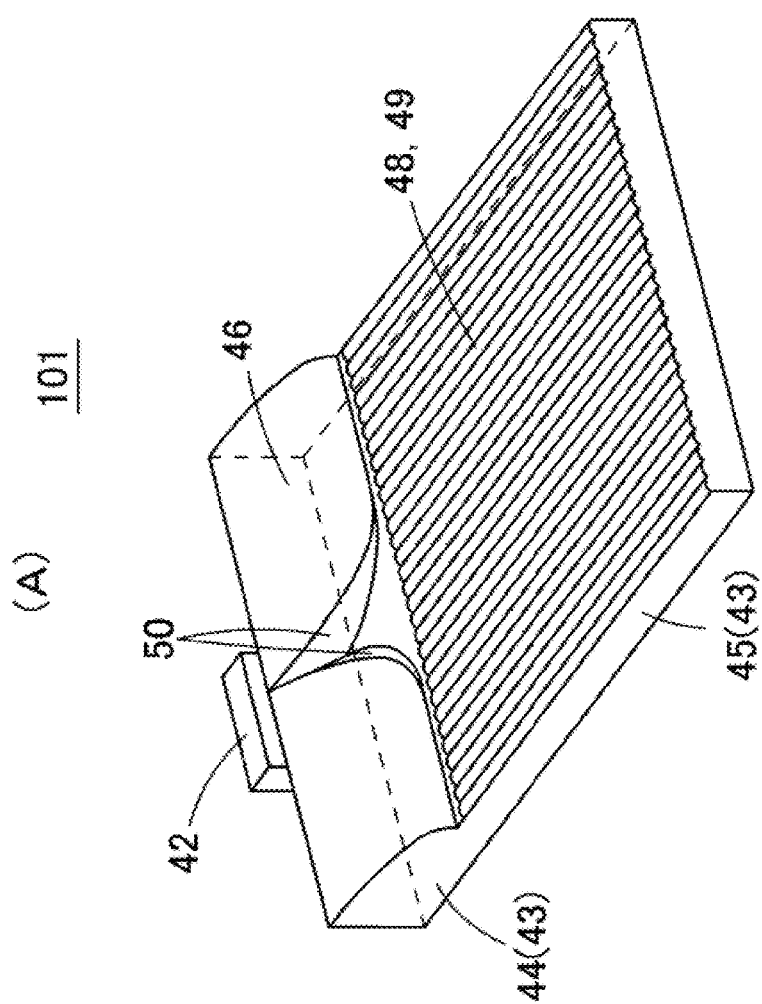
FIG. 28A is a perspective view illustrating when a light guide plate according to a fifth embodiment is viewed from the upper surface.
Figure 28B:
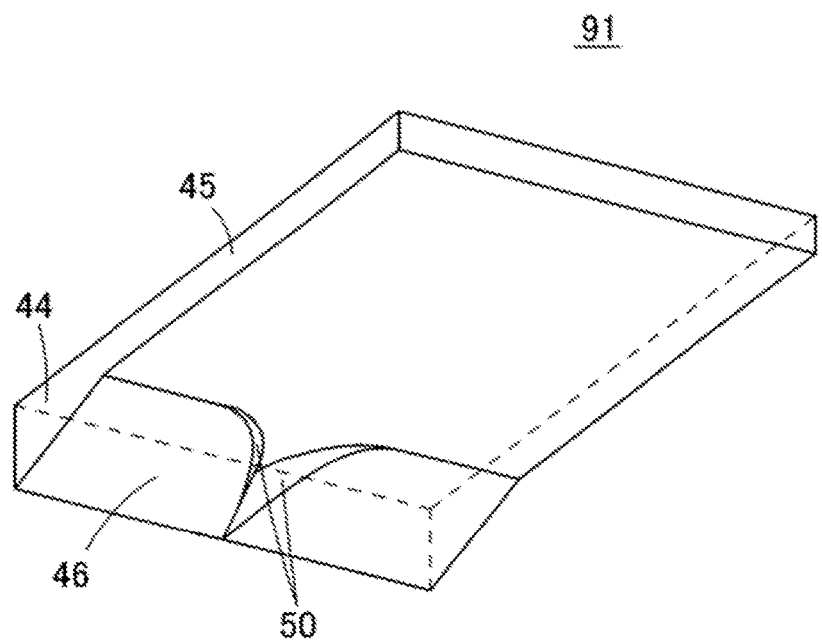
FIG. 28B is a perspective view illustrating when the light guide plate in FIG. 28A is viewed from the lower surface.

FIG. 28A is a perspective view illustrating when a light guide plate 91 according to a fifth embodiment is viewed from the upper surface. FIG. 28B is a perspective view from the lower surface of the light guide plate 91. In the fifth embodiment, the slanted surface 46 and the cylindrical surfaces 50 are provided on the lower surface of the light conducting portion 44, while the lenticular lens 49 is formed on the upper surface of the main light guiding body 45.

Sixth Embodiment

Figure 29A:
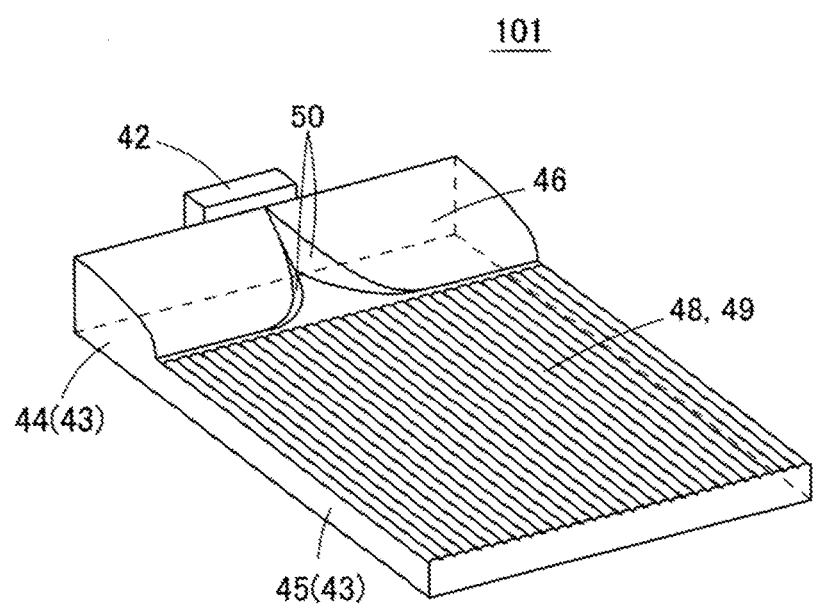
FIG. 29A is a perspective view of a surface illumination device to a sixth embodiment.

FIG. 29A is a perspective view illustrating a surface illumination device 101 according to a sixth embodiment.

Figure 29B:
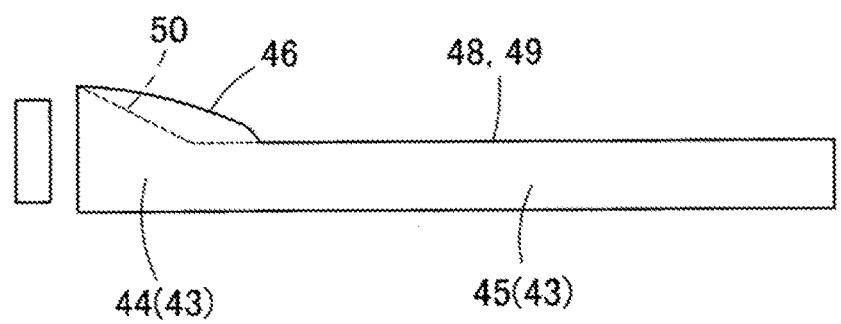
FIG. 29B is a side view of the surface illumination device illustrated in FIG. 29A.

FIG. 29B is a side view of the surface illumination device 101. As exemplified by the surface illumination device 101, the slanted surface 46 may be curved.

Figure 30A:
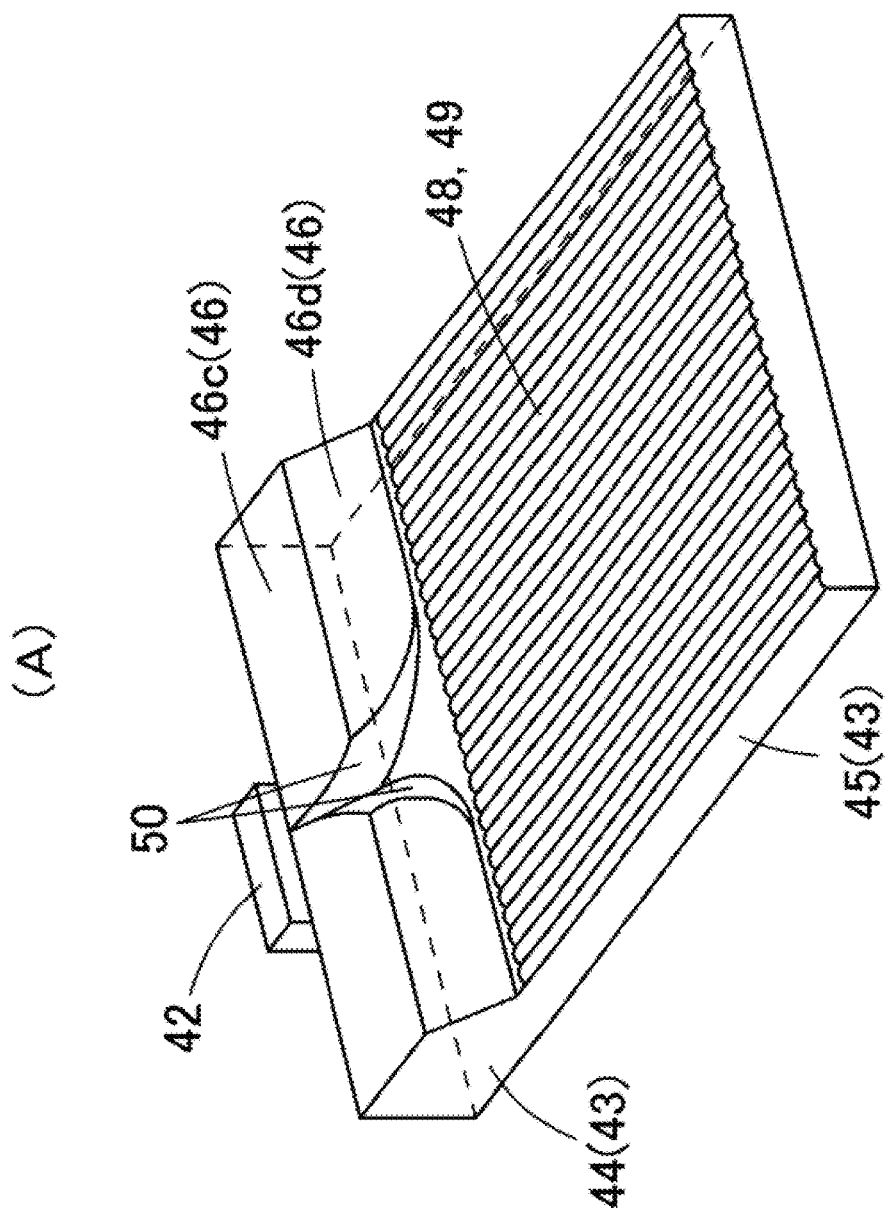
FIG. 30A is a perspective view illustrating a modification example for the surface illumination device to the sixth embodiment.
Figure 30B:
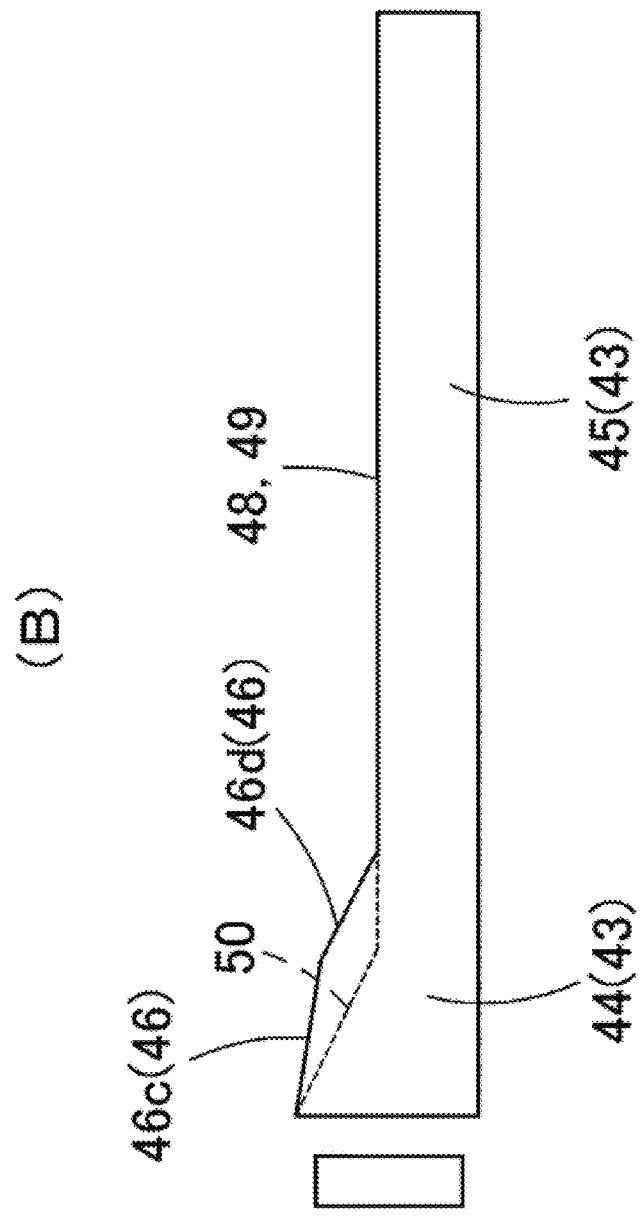
FIG. 30B is a side view of the surface illumination device illustrated in FIG. 30A.

Additionally, as exemplified by the modification examples in FIGS. 30A and 30B, the slanted surface 46 may include a plurality of sections 46c, 46d having different inclinations, and these sections may appear curved when viewed from the side.

Seventh Embodiment

Figure 31:
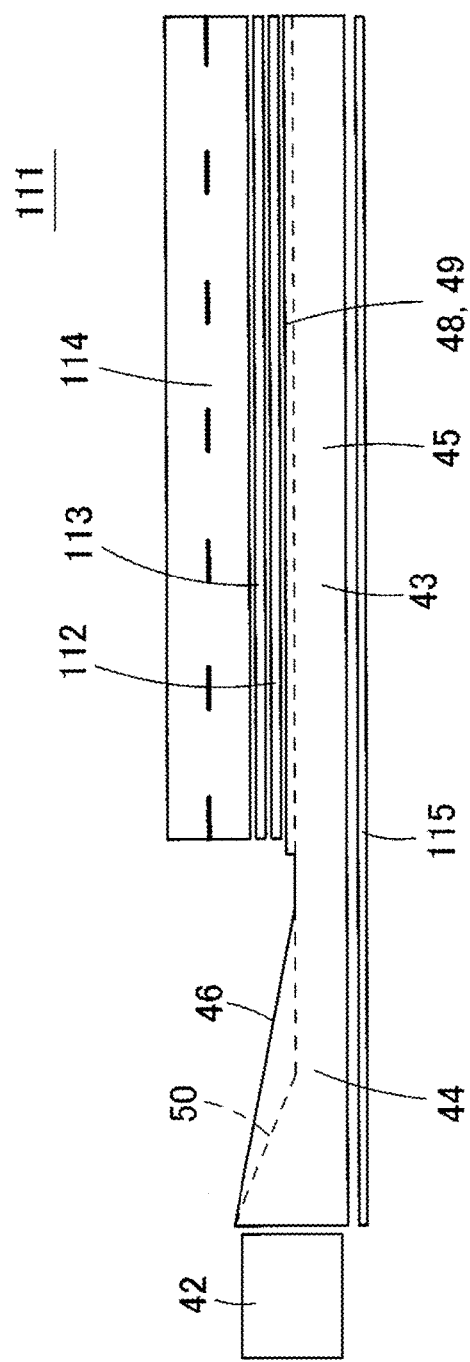
FIG. 31 is a schematic cross-sectional view of a liquid crystal display device according to one or more embodiments of the invention.

FIG. 31 is a schematic cross-sectional view illustrating a liquid crystal display device 111 that uses a surface illumination device according to one or more embodiments of the present invention. The liquid crystal display device 111 uses, for instance, the surface illumination device 41 according to the first embodiment. As illustrated in FIG. 31, a diffusion plate 112, one or two prismatic sheets 113, and a liquid crystal panel 114 are arranged overlapping on the light output surface 48 of the light guide plate 43. A reflective sheet 114 is arranged facing the rear surface of the light guide plate 43. The liquid crystal display device 111 makes use of the features of the surface illumination device according to one or more embodiments of the present invention. Thus, the light use efficiency of the liquid crystal display device 111 improves, facilitating better viewing of the screen, and further allowing the liquid crystal display device 111 to have a thinner profile.

Eighth Embodiment

Figure 32:
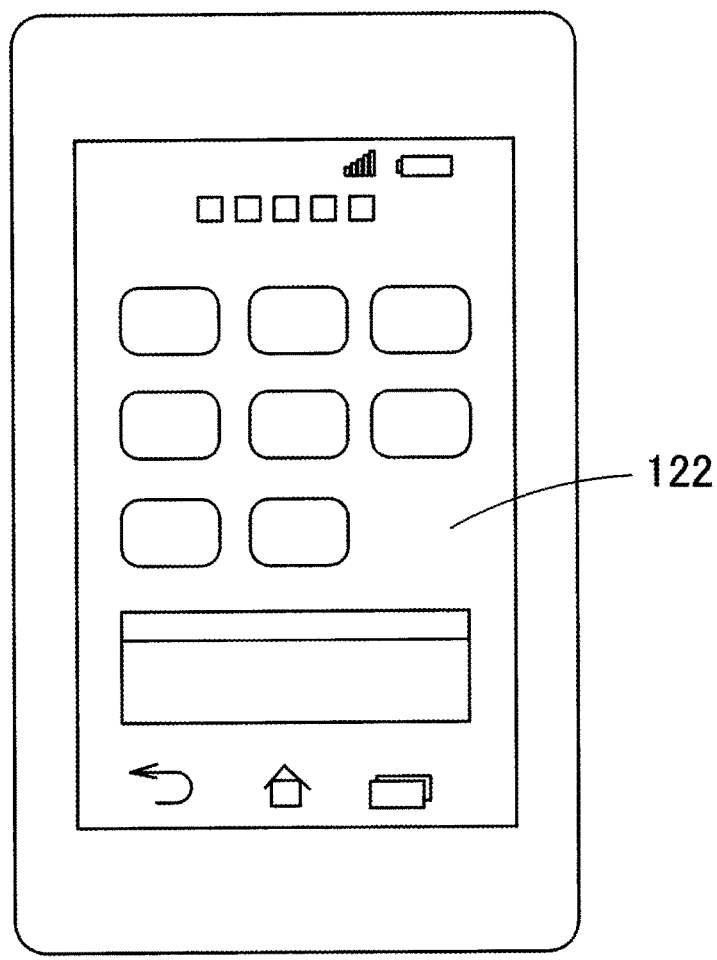
FIG. 32 is a schematic perspective view of a mobile device according to one or more embodiments of the invention.

FIG. 32 is a front view illustrating a mobile device employing a liquid crystal display device according to the seventh embodiment. Namely, FIG. 32 is a front view of a smartphone 121. The smartphone 121 is equipped with a liquid crystal display device 122 having a touch screen panel added to the front surface. When a liquid crystal display device according to the seventh embodiment is used in the smartphone 121, the improved light use efficiency of the surface illumination device improves the brightness of the display screen of the smartphone. Additionally, a surface illumination device according to the one or more embodiments of the present invention may be adopted in mobile devices besides portable phones like smartphones, such as tablet computers, electronic dictionaries, electronic book readers, and the like.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A light guide plate comprising:
   a light conducting portion comprising a light input surface for introducing light into the light guide plate;
   a main light guiding body that is thinner than a maximum thickness of the light conducting portion, and disposed continuously from the light conducting portion;
   a slanted surface that is disposed on the light conducting portion on at least one of a surface near a light output surface and a surface opposite the surface near the light output surface, and that is inclined from a section of the light guide plate that is thicker than the main light guiding body toward an end of the main light guiding body;
   two cylindrical surfaces that cut into the slanted surface; and
   a groove formed by the two cylindrical surfaces,
   wherein an inclination of the slanted surface with respect to a surface of the main light guiding body near the cylindrical surfaces is smaller than an inclination of an axis center of the cylindrical surfaces with respect to the surface of the main light guiding body.

2. The light guide plate according to claim 1, wherein the axis center of the cylindrical surfaces increasingly inclines closer to the light input surface of the light conducting portion in accordance with moving upward along the axis center.

3. The light guide plate according to claim 1, wherein an edge of the slanted surface touches an edge of the light input surface provided on the light conducting portion.

4. The light guide plate according to claim 3, wherein an end of the groove reaches an edge of the light input surface.

5. The light guide plate according to claim 1,
   wherein, when a maximum thickness of the light conducting portion is T, a thickness of the main light guiding body is t, and a length of the slanted surface in a direction parallel to the surface of the main light guiding body is L, the inclination α of the slanted surface is characterized by:

$\alpha < \arctan[(T-t)/L]$.

6. The light guide plate according to claim 1, wherein a lenticular lens is disposed on the light output surface of the main light guide plate.

7. The light guide plate according to claim 6, wherein a directivity conversion pattern is provided in a region between the slanted surface and the lenticular lens.

8. The light guide plate according to claim 7,
   wherein the directivity conversion pattern is formed by inclined surfaces with different inclination directions arranged next to each other along a width direction of the light input surface; and
   wherein, in a cross section of the directivity conversion pattern parallel to the light input surface, a cross-sectional shape of the directivity conversion pattern passes through an emission center of a light incident on the light input surface; and for a region on each side surrounding an imaginary straight line orthogonal to the light input surface, when a normal line is projected from the inside toward the outside of the light guide plate from each of the inclined surfaces in the directivity conversion pattern, a total transverse width for the inclined surfaces where the normal line inclines toward the imaginary line is smaller than a total transverse width for the inclined surfaces where the normal line inclines toward a direction opposite the imaginary line.

9. The light guide plate according to claim 1,
   wherein a first point on a side surface of the light conducting portion is relatively far away from the light input surface;
   wherein a second point the side surface of the light conducting portion is close to the light input surface; and
   wherein, on comparing the first point and the second point on the side surface, an angle the side surface forms with a direction orthogonal to the light input surface at the first point is greater than or equal to an angle the side surface forms with a direction orthogonal to the light input surface at the second point.

10. The light guide plate according to claim 9,

Wherein, when viewed from above, both side surfaces of the light conducting portion are inclined relative to a direction orthogonal to the light conducting portion to increase the width of the light conducting portion in accordance with a distance from the light conducting portion.

11. The light guide plate according to claim 10, wherein each of the side surfaces of the light conducting portion is formed by a plurality of flat surfaces.

12. The light guide plate according to claim 11, wherein each of the side surfaces of the light conducting portion is formed by a first flat surface located relatively close to the light input surface and a second flat surface located relatively far away from the light input surface; and wherein, on comparing the first flat surface and the second flat surface, a length of the first flat surface along a direction orthogonal to the light input surface is longer than a length of the second flat surface along the direction orthogonal to the light input surface.

13. The light guide plate according to claim 10, wherein each of the side surfaces of the light conducting portion is formed by curved bent surfaces.

14. The light guide plate according to claim 9, wherein a tip end of a normal line projected outward from the side surface of the light conducting portion is inclined toward a light output portion of the main light guiding body.

15. A surface illumination device comprising:
a light guide plate according to claim 1; and
a light source arranged opposite the light input surface of the light guide plate.

16. A liquid crystal display device comprising:
a surface illumination device according to claim 15; and
a liquid crystal panel.

17. A mobile device comprising:
a liquid crystal display device according to claim 16.

* * * * *

UNITED STATES PATENT AND TRADEMARK OFFICE
CERTIFICATE OF CORRECTION

PATENT NO. : 9,798,063 B2  
APPLICATION NO. : 14/683681  
DATED : October 24, 2017  
INVENTOR(S) : Masayuki Shinohara et al.

Page 1 of 1

It is certified that error appears in the above-identified patent and that said Letters Patent is hereby corrected as shown below:

At Column 3, Line 4, the word "To" should read -- Io --

At Column 10, Line 52, the word "Angle cp" should read -- angle φ --

At Column 10, Line 63, the word "We" should read -- Wc --

At Column 15, Line 17, the word "Angle 4" should read -- angle ξ --

At Column 18, Claim 5, Line 28, the word "$\alpha < \arctan [(T-t)/L]$" should read -- $\alpha \leq \arctan [(T-t)/L]$ --

Signed and Sealed this  
Twenty-seventh Day of March, 2018

Andrei Iancu  
*Director of the United States Patent and Trademark Office*